(12) United States Patent
Li et al.

(10) Patent No.: US 11,977,946 B2
(45) Date of Patent: May 7, 2024

(54) METHOD FOR AUTOMATICALLY ACTIVATING NFC APPLICATION AND TERMINAL

(71) Applicant: HUAWEI TECHNOLOGIES CO., LTD., Shenzhen (CN)

(72) Inventors: Tao Li, Shanghai (CN); Jiahao Zhen, Shenzhen (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 17/290,451

(22) PCT Filed: Oct. 23, 2019

(86) PCT No.: PCT/CN2019/112689
§ 371 (c)(1),
(2) Date: Apr. 30, 2021

(87) PCT Pub. No.: WO2020/088318
PCT Pub. Date: May 7, 2020

(65) Prior Publication Data
US 2022/0036017 A1 Feb. 3, 2022

(30) Foreign Application Priority Data

Nov. 1, 2018 (CN) .......................... 201811294647.4
Dec. 19, 2018 (CN) .......................... 201811561669.2

(51) Int. Cl.
*G06K 7/10* (2006.01)
*G06K 19/07* (2006.01)

(52) U.S. Cl.
CPC ..... *G06K 7/10297* (2013.01); *G06K 19/0723* (2013.01)

(58) Field of Classification Search
CPC ....................... G06K 7/10297; G06K 19/0723
(Continued)

(56) References Cited

U.S. PATENT DOCUMENTS

2012/0108169 A1* 5/2012 Degauque ........... H04W 12/065
455/41.1
2012/0178366 A1 7/2012 Levy et al.
(Continued)

FOREIGN PATENT DOCUMENTS

| CN | 102047223 A | 5/2011 |
|----|-------------|--------|
| CN | 103065107 A | 4/2013 |

(Continued)

OTHER PUBLICATIONS

Chinese Office Action issued in corresponding Chinese Application No. 201811561669.2, dated Nov. 25, 2020, pp. 1-12.
(Continued)

*Primary Examiner* — Michael G Lee
*Assistant Examiner* — David Tardif
(74) *Attorney, Agent, or Firm* — HAUPTMAN HAM, LLP

(57) ABSTRACT

This application discloses a method for automatically activating an NFC application and a terminal, and relates to the terminal field. When a terminal has a plurality of SEs, an NFC application accessed by a transaction instruction is automatically activated. The terminal may include an NFC controller and at least two SEs, and each of the at least two SEs carries at least one NFC application. A specific solution is as follows: The NFC controller receives a transaction instruction, determines a target SE from the at least two SEs according to the transaction instruction, and sends the transaction instruction to the target SE; the target SE receives the transaction instruction, and determines, according to the transaction instruction, a target NFC application from an (Continued)

NFC application carried in the target SE; and the target SE runs the target NFC application, and executes the transaction instruction.

15 Claims, 11 Drawing Sheets

(58) Field of Classification Search
USPC .......................................................... 235/376
See application file for complete search history.

(56) References Cited

U.S. PATENT DOCUMENTS

| | | | | |
|---|---|---|---|---|
| 2013/0035070 | A1* | 2/2013 | Fisher | G06Q 30/0238 455/411 |
| 2013/0299596 | A1* | 11/2013 | Choi | H04W 12/082 235/492 |
| 2014/0036723 | A1* | 2/2014 | Rizzo | H04B 5/0031 370/254 |
| 2016/0140537 | A1* | 5/2016 | Salcedo | G06Q 30/04 705/44 |
| 2016/0314456 | A1* | 10/2016 | Douglas | G06Q 20/321 |
| 2018/0349585 | A1* | 12/2018 | Ahn | H04W 12/068 |

FOREIGN PATENT DOCUMENTS

| | | |
|---|---|---|
| CN | 103222291 A | 7/2013 |
| CN | 103503323 A | 1/2014 |
| CN | 103632264 A | 3/2014 |
| CN | 103701506 A | 4/2014 |
| CN | 103778395 A | 5/2014 |
| CN | 104463255 A | 3/2015 |
| CN | 105574749 A | 5/2016 |
| CN | 109257071 A | 1/2019 |
| EP | 2641411 B1 | 10/2018 |
| WO | 2016049885 A1 | 4/2016 |

OTHER PUBLICATIONS

European Search Report issued in corresponding European Application No. 19880697.8, dated Oct. 15, 2021, pp. 1-10.
International Search Report issued in corresponding International Application No. PCT/CN2019/112689, dated Jan. 19, 2020, pp. 1-12.

* cited by examiner

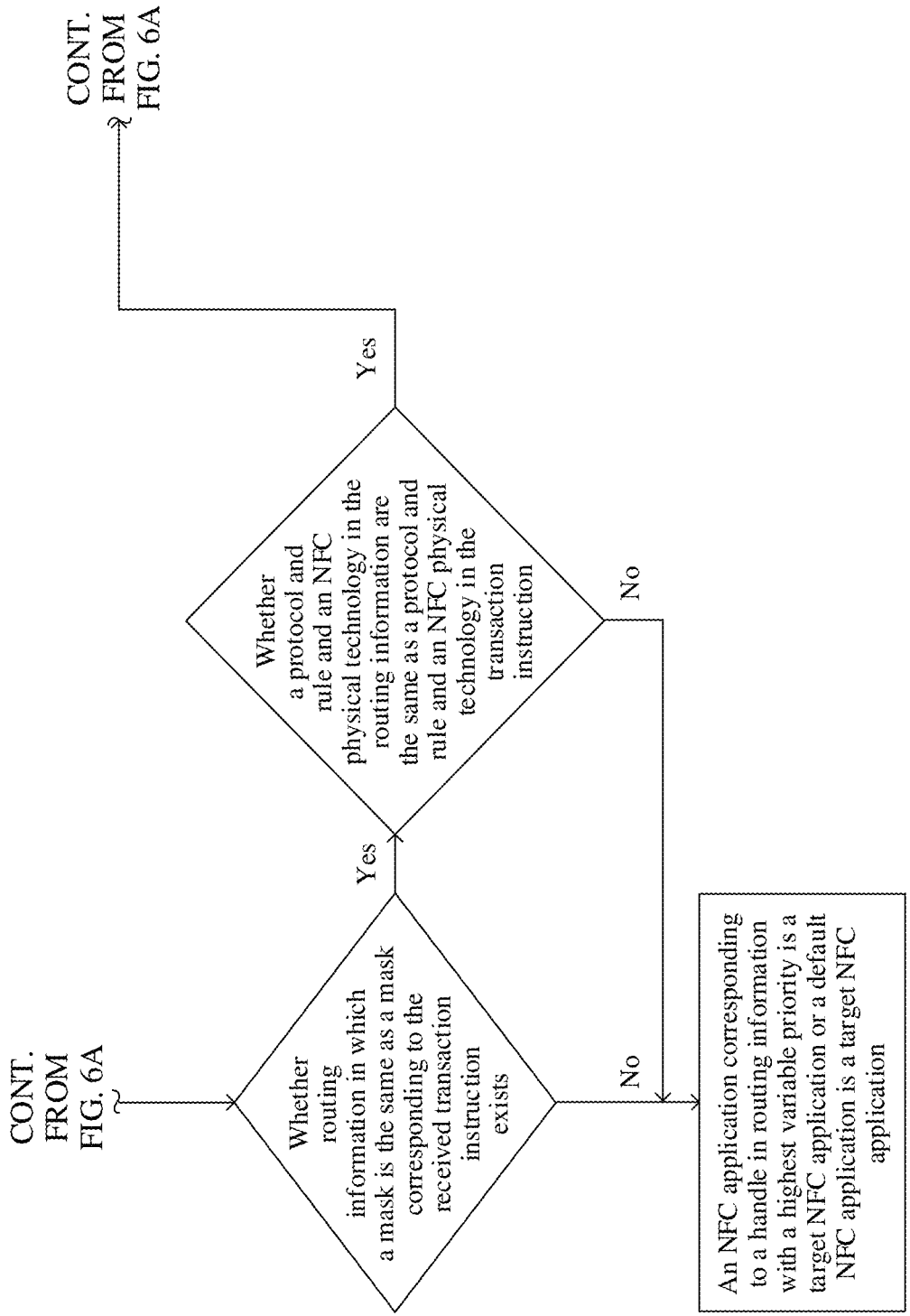

METHOD FOR AUTOMATICALLY ACTIVATING NFC APPLICATION AND TERMINAL

CROSS-REFERENCE TO RELATED APPLICATIONS

This application is a national stage of International Application No. PCT/CN2019/112689, filed on Oct. 23, 2019, which claims priority to Chinese Patent Application No. 201811561669.2, filed on Dec. 19, 2018 and Chinese Patent Application No. 201811294647.4, filed on Nov. 1, 2018. All of the aforementioned applications are incorporated herein by reference in their entireties.

TECHNICAL FIELD

This application relates to the terminal field, and in particular, to a method for automatically activating a near field communication (Near Field Communication, NFC) application and a terminal.

BACKGROUND

NFC is a near field wireless communication technology based on a 13.56 megahertz (MHz) carrier frequency that allows non-contact point-to-point data transmission between devices. NFC has become more popular and has been accepted by the public in recent years because of high security. Particularly, a terminal with an NFC function develops rapidly. The terminal with the NFC function may work in three modes: a card reader mode, a card simulation mode, and a point-to-point mode. The card simulation mode is most commonly used. That is, the terminal may be simulated as a non-contact integrated circuit (Integrated Circuit, IC) card, and a user may interact with a card reader by holding the terminal, to complete operations such as swiping a bank card, swiping a bus card, or swiping a door access card. This brings a lot of convenience to life.

Before the terminal is simulated as the non-contact IC card to interact with the card reader, the terminal downloads a corresponding NFC application to a secure element (Security Element, SE). The SE may provide a secure execution environment for running of the NFC application and provide a secure storage environment for sensitive data of the NFC application. One SE may simultaneously carry a plurality of NFC applications. When the NFC application carried in the SE is activated, the terminal may be simulated as the corresponding non-contact IC card to interact with the card reader. The NFC application may be manually activated by the user. Alternatively, the NFC application may be automatically activated by the terminal. Specifically, after receiving a transaction instruction sent by the card reader, the terminal may determine, based on an application identifier (Application Identifier, AID) carried in the transaction instruction, which NFC application carried in the SE is accessed by the transaction instruction, and automatically activate the NFC application accessed by the transaction instruction.

However, currently, no unified specification is formed for NFC applications, and a plurality of parties, such as a mobile operator, an electronic device manufacturer, and an application producer, are all leading in customization of an SE. Therefore, one terminal may have a plurality of SEs. Generally, when the SE is in an active state, the terminal can automatically activate, based on the AID carried in the transaction instruction, the NFC application to be accessed by the transaction instruction. However, currently, one SE is in an active state in the terminal. Therefore, when the transaction instruction accesses an NFC application carried in an SE that is in an inactive state, the terminal cannot automatically activate the corresponding NFC application. In this case, the user can manually choose to activate the corresponding NFC application to complete interaction with the card reader. Therefore, when the terminal has a plurality of SEs, how to automatically activate the NFC application accessed by the transaction instruction has become an important research topic for a person skilled in the art.

SUMMARY

Embodiments of this application provide a method for automatically activating an NFC application and a terminal, so that when a terminal has a plurality of SEs, an NFC application accessed by a transaction instruction is automatically activated.

The following technical solutions are used in this application.

According to a first aspect of this application, a terminal is provided. The terminal may include an NFC controller and at least two secure elements SEs, and each of the at least two SEs carries at least one NFC application. The NFC controller receives a transaction instruction, determines a target SE from the at least two SEs according to the transaction instruction, and sends the received transaction instruction to the target SE; the target SE receives the transaction instruction, and determines, according to the received transaction instruction, a target NFC application from an NFC application carried in the target SE; and the target SE runs the target NFC application, and executes the transaction instruction.

According to the technical solution, after receiving the transaction instruction, the terminal can automatically identify a corresponding NFC application according to the transaction instruction and automatically activate the corresponding NFC application, to complete a transaction. A user does not perform manual switching, thereby improving efficiency of interaction between the terminal and the user, and improving intelligence of the terminal. In this way, use experience of the user is greatly improved.

In a possible implementation, the determining a target SE from the at least two SEs according to the transaction instruction may specifically include: The NFC controller determines first routing information from a first routing table based on the first routing table and the transaction instruction, where the first routing information is routing information that meets a first matching condition in the first routing table, and the first routing information includes an SE identifier; and the NFC controller determines, as the target SE, an SE identified by the SE identifier in the at least two SEs, where the first matching condition may include at least one of the following: a condition a: an AID in routing information is the same as an application identifier AID carried in the transaction instruction; a condition b: a protocol and rule in routing information is the same as a protocol and rule that the transaction instruction complies with; a condition c: an NFC physical technology in routing information is the same as an NFC physical technology used by the transaction instruction; and a condition d: a transaction instruction in routing information is the same as the received transaction instruction.

In another possible implementation, that the NFC controller determines first routing information from a first routing table based on the first routing table and the transaction instruction may specifically include: The NFC controller sequentially determines routing information in the first routing table based on the first routing table and the transaction instruction in a first preset order of the condition a, the condition b, the condition c, and the condition d, and determines, as the first routing information, routing information that is in the first routing table and that meets the first condition in the first preset order.

In another possible implementation, the first preset order may be: the condition a→the condition b→the condition c→the condition d. Certainly, the first preset order may be another order, for example, the condition a→the condition c→the condition d→the condition b.

In another possible implementation, for example, an SE such as the target SE may carry at least two NFC applications. The determining, according to the transaction instruction, a target NFC application from an NFC application carried in the target SE may specifically include: The target SE determines second routing information from a second routing table based on the second routing table and the transaction instruction, where the second routing information may be routing information that meets a second matching condition in the second routing table, and the second routing information includes a handle; and the target SE determines, as the target NFC application, an NFC application corresponding to the handle in the at least two NFC applications, where the second matching condition may include at least one of the following: a condition e: an AID in routing information is the same as an AID carried in the transaction instruction; a condition f: a transaction instruction in routing information is the same as the received transaction instruction; a condition g: a mask in routing information is the same as a mask corresponding to the received transaction instruction; and a condition h: a variable priority included in routing information is a first priority, and the first priority is a highest variable priority in routing information in the second routing table.

In another possible implementation, that the target SE determines second routing information from a second routing table based on the second routing table and the transaction instruction may specifically include: The target SE sequentially determines the routing information in the second routing table based on the second routing table and the transaction instruction in a second preset order of the condition e, the condition f, the condition g, and the condition h, and determines, as the second routing information, routing information that is in the second routing table and that meets the first condition in the second preset order.

In another possible implementation, the second preset order may be: the condition e→the condition f→the condition g→the condition h. Certainly, the second preset order may be another order, for example, the condition e→the condition g→the condition f→the condition h.

In another possible implementation, when the target NFC application is being downloaded, the NFC controller may configure the first routing information in the first routing table, where the first routing information may further include at least one of the following: an AID of the target NFC application, a protocol and rule that a transaction instruction accessing the target NFC application complies with, an NFC physical technology used by the transaction instruction accessing the target NFC application, and the transaction instruction accessing the target NFC application. The first routing information may further include a power consumption requirement on the terminal when the target NFC application is being accessed.

In another possible implementation, when the target NFC application is being downloaded, the target SE may configure the second routing information in the second routing table, where the second routing information may further include at least one of the following: an AID of the target NFC application, a transaction instruction accessing the target NFC application, a mask corresponding to the transaction instruction accessing the target NFC application, and a variable priority of the target NFC application. The second routing information may further include: a protocol and rule that the transaction instruction accessing the target NFC application complies with, and an NFC physical technology used by the transaction instruction accessing the target NFC application.

In another possible implementation, when the first routing information meets the first matching condition, a power consumption status in the first routing information is the same as a current power consumption status of the terminal. Therefore, the current power consumption status of the terminal is matched with a power consumption status during running of an NFC application, so that security of automatically activating an NFC application can be improved.

In another possible implementation, when the second routing information meets the second matching condition, a protocol and rule in the second routing information is the same as the protocol and rule that the received transaction instruction complies with, and an NFC physical technology in the second routing information is the same as the NFC physical technology used by the received transaction instruction. Therefore, when the target NFC application is being determined, one or two pieces of information such as the protocol and rule that the transaction instruction accessing the NFC application complies with and the NFC physical technology used by the transaction instruction accessing the NFC application may be used as an auxiliary condition. In this way, security of automatically activating an NFC application can be improved.

According to a second aspect of this application, a method for automatically activating an NFC application is provided. The method may be applied to a terminal, the terminal may include at least two SEs, and each of the at least two SEs carries at least one NFC application. The method may include: The terminal receives a transaction instruction, and determines a target SE from the at least two SEs according to the received transaction instruction; the terminal determines, according to the transaction instruction, a target NFC application from an NFC application carried in the target SE; and the terminal runs the target NFC application by using the target SE, and executes the transaction instruction.

In a possible implementation, that the terminal determines a target SE from the at least two SEs according to the transaction instruction may specifically include: The terminal determines first routing information from a first routing table based on the first routing table and the transaction instruction, where the first routing information may be routing information that meets a first matching condition in the first routing table, and the first routing information includes an SE identifier; and the terminal determines, as the target SE, an SE identified by the SE identifier in the at least two SEs, where the first matching condition may include at least one of the following: a condition a: an AID in routing information is the same as an application identifier AID carried in the transaction instruction; a condition b: a protocol and rule in routing information is the same as a protocol and rule that the transaction instruction complies with; a condition c: an NFC physical technology in routing information is the same as an NFC physical technology used by the transaction instruction; and a condition d: a transaction instruction in routing information is the same as the received transaction instruction.

In another possible implementation, that the terminal determines first routing information from a first routing table based on the first routing table and the transaction instruction may specifically include: The terminal sequentially determines routing information in the first routing table based on the first routing table and the transaction instruction in a first preset order of the condition a, the condition b, the condition c, and the condition d, and determines, as the first routing information, routing information that is in the first routing table and that meets the first condition in the first preset order.

In another possible implementation, the first preset order may be: the condition a→the condition b→the condition c→the condition d.

In another possible implementation, an SE carries at least two NFC applications. That the terminal determines, according to the transaction instruction, a target NFC application from an NFC application carried in the target SE may specifically include: The terminal determines second routing information from a second routing table based on the second routing table and the transaction instruction, where the second routing information may be routing information that meets a second matching condition in the second routing table, and the second routing information includes a handle; and the terminal determines, as the target NFC application, an NFC application corresponding to the handle in the at least two NFC applications, where the second matching condition may include at least one of the following: a condition e: an AID in routing information is the same as an AID carried in the transaction instruction; a condition f: a transaction instruction in routing information is the same as the received transaction instruction; a condition g: a mask in routing information is the same as a mask corresponding to the received transaction instruction; and a condition h: a variable priority included in routing information is a first priority, and the first priority is a highest variable priority in routing information in the second routing table.

In another possible implementation, that the terminal determines second routing information from a second routing table based on the second routing table and the transaction instruction may specifically include: The terminal sequentially determines the routing information in the second routing table based on the second routing table and the transaction instruction in a second preset order of the condition e, the condition f, the condition g, and the condition h, and determines, as the second routing information, routing information that is in the second routing table and that meets the first condition in the second preset order.

In another possible implementation, the second preset order may be: the condition e→the condition f→the condition g→the condition h.

In another possible implementation, the method may further include: When downloading the target NFC application, the terminal configures the first routing information in the first routing table, where the first routing information may further include at least one of the following: an AID of the target NFC application, a protocol and rule that a transaction instruction accessing the target NFC application complies with, an NFC physical technology used by the transaction instruction accessing the target NFC application, and the transaction instruction accessing the target NFC application.

In another possible implementation, the method may further include: When downloading the target NFC application, the terminal configures the second routing information in the second routing table, where the second routing information further includes at least one of the following: an AID of the target NFC application, a transaction instruction accessing the target NFC application, a mask corresponding to the transaction instruction accessing the target NFC application, and a variable priority of the target NFC application.

In another possible implementation, when the first routing information meets the first matching condition, a power consumption status in the first routing information is the same as a current power consumption status of the terminal.

In another possible implementation, when the second routing information meets the second matching condition, a protocol and rule in the second routing information is the same as the protocol and rule that the received transaction instruction complies with, and an NFC physical technology in the second routing information is the same as the NFC physical technology used by the received transaction instruction.

It should be noted that the method provided in the second aspect and the possible implementations of the second aspect is in a one-to-one correspondence with the terminal provided in the first aspect or the possible implementations of the first aspect. Therefore, for beneficial effects that can be achieved by the method, refer to the beneficial effects of the corresponding terminal provided above. Details are not described herein again.

According to a third aspect of this application, a method for automatically activating an NFC application is provided. The method may be applied to a terminal, the terminal may include at least two SEs, a first SE of the at least two SEs is in an active state by default, the first SE is any one of the at least two SEs, and the first SE carries an NFC application that supports application identifier AID identification in the terminal. The method may include: The terminal receives a first transaction instruction, where the first transaction instruction may include an AID; and the terminal runs, by using the first SE, an NFC application identified by the AID in the first transaction instruction, and executes the first transaction instruction.

According to the technical solution, all NFC applications that support AID identification in the terminal are carried in an SE that is in an active state by default in the terminal. Therefore, after receiving a transaction instruction, the terminal can automatically identify a corresponding NFC application based on an AID in the transaction instruction and automatically activate the corresponding NFC application, to complete a transaction. A user does not perform manual switching, thereby improving efficiency of interaction between the terminal and the user, and improving intelligence of the terminal. In this way, use experience of the user is greatly improved.

In a possible implementation, an NFC application that supports AID identification in the terminal includes a first NFC application. The method may further include: When downloading the first NFC application, the terminal determines that the first NFC application supports AID identification; and the terminal downloads the first NFC application to the first SE.

In another possible implementation, that the terminal determines that the first NFC application supports AID identification may specifically include: The terminal determines that an AID of the first NFC application is included in a whitelist, where the whitelist includes an AID of an NFC application that supports AID identification.

In another possible implementation, the at least two SEs further include a second SE, and the NFC application that supports AID identification in the terminal includes a second NFC application. The method may further include: When the second NFC application is carried in the second SE, the terminal determines that the second NFC application supports AID identification; and the terminal moves the second NFC application from the second SE to the first SE.

In another possible implementation, the first SE further carries an NFC application whose use frequency is greater than a threshold in the terminal. The method may further include: The terminal receives a second transaction instruction; the terminal obtains a time and/or a geographical location at which the second transaction instruction is received; the terminal determines, based on the time and/or the geographical location at which the second transaction instruction is received, an NFC application to be accessed by the second transaction instruction; and the terminal runs, by using the first SE, the NFC application to be accessed by the second transaction instruction, and executes the second transaction instruction. Therefore, an NFC application whose use frequency is relatively high is carried in an SE that is in an active state by default in the terminal, and a corresponding NFC application is automatically activated based on a time and/or a geographical location at which a transaction instruction is received, to complete a transaction. A user does not perform manual switching, thereby further improving efficiency of interaction between the terminal and the user, and improving intelligence of the terminal. In this way, use experience of the user is greatly improved.

According to a fourth aspect of this application, a method for automatically activating an NFC application is provided. The method may be applied to a terminal, and the terminal carries at least two NFC applications. The method may include: The terminal receives a push message sent by a server, where the push message may be used to indicate the terminal to activate a first NFC application of the at least two NFC applications; and the terminal automatically activates the first NFC application in response to the push message.

Most users use a specified NFC application at a specified time in a specified place. Terminals of these users may report, to the server, information used to indicate that the NFC application is used at the specified time in the specified place. After the user arrives at the specified place at the specified time, the terminal of the user may receive a push message sent by the server, where the push message is used to indicate the terminal to recommend the corresponding to-be-used NFC application to the user. Therefore, the terminal may automatically activate the corresponding NFC application based on the push message. The user does not perform manual switching, thereby improving efficiency of interaction between the terminal and the user, and improving intelligence of the terminal. In this way, use experience of the user is greatly improved.

According to a fifth aspect of this application, an NFC chip system is provided, and the NFC chip system may include an NFC chip and at least two SEs. The NFC chip and a target SE of the at least two SEs are configured to perform the method for automatically activating an NFC application according to any one of the second aspect and the possible implementations of the third aspect, or any one of the third aspect and the possible implementations of the third aspect, or any one of the fourth aspect. It may be understood that the NFC chip system is configured to perform the corresponding method provided above. Therefore, for beneficial effects that can be achieved by the NFC chip system, refer to the beneficial effects in the corresponding method provided above. Details are not described herein again.

BRIEF DESCRIPTION OF DRAWINGS

FIG. 6A and FIG. 6B are another schematic scenario diagram of a method for automatically activating an NFC application according to an embodiment of this application;

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "a plurality of" means two or more than two.

For ease of understanding, example descriptions of some concepts related to the embodiments of this application are provided for reference. Details are shown as follows:

An NFC application is an application program used to implement near field communication, and has a simulation function used to simulate a non-contact IC card. NFC applications may be classified into different types based on different application scenarios, for example, a bus application, a door access application, and a bank card application. The NFC application has an AID, but not all NFC applications use AIDs. An NFC application that uses an AID supports AID identification, that is, a terminal can identify, based on an AID carried in a transaction instruction, an NFC application accessed by the transaction instruction.

To implement card simulation, the terminal includes three function entities: a device host (device host, DH), an NFC controller (NFC controller, NFCC), and an SE.

The DH may be responsible for managing the NFCC, such as initialization, configuration, and power management.

The NFCC may be responsible for physical transmission of data by using an antenna. The DH may be included in a master chip of the terminal, and the NFCC may be included in an NFC chip of the terminal.

The SE may be responsible for providing a secure execution environment (for example, authentication and authorization) and a storage environment of sensitive data for an NFC application. The SE is a secure element chip. The SE may simultaneously carry a plurality of NFC applications.

Figure 1:
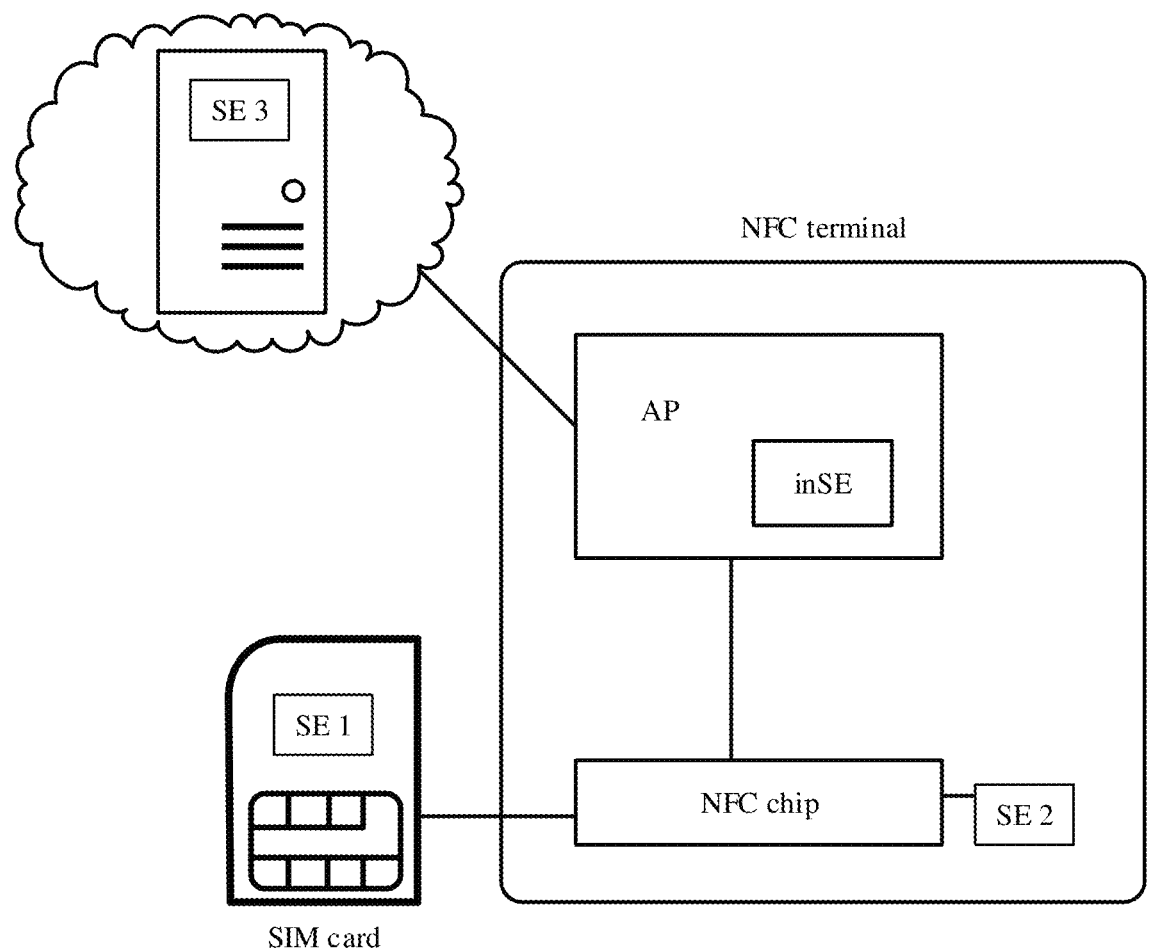
FIG. 1 is a schematic diagram of deployment of an SE in a terminal according to some embodiments.

The terminal may have one or more SEs. If the terminal has a plurality of SEs, the SEs may exist in different forms. For example, as shown in FIG. 1, the terminal has three SEs. The three SEs may be: an SE 1 that exists in a form of a subscriber identification module (subscriber identification module, SIM) card, an SE 2 that is encapsulated with the NFC chip, and an inSE that exists in a form of the master chip (for example, an application processor (application processor, AP) shown in FIG. 1) of the terminal. For the inSE, hardware of the SE, for example, an SE 3 shown in FIG. 1, is deployed in a server located on a cloud.

Certainly, the foregoing SE is merely used as an example. In this embodiment, the SE may exist in the terminal in another form. For example, an SE exists in a form of an SD card. For another example, an SE exists in a form of a universal integrated circuit card (Universal Integrated Circuit Card, UICC). This is not limited in this embodiment.

Generally, when the SE is in an active state, the terminal can automatically activate the NFC application accessed by the received transaction instruction. However, one SE is in an active state in the terminal. Therefore, when the terminal has a plurality of SEs, if the transaction instruction accesses an NFC application carried in an SE that is in an inactive state, the terminal cannot automatically activate the corresponding NFC application. For example, with reference to FIG. 1, the SE 1 that exists in the form of the SIM card is currently in an active state. When the terminal approaches a card reader (or a POS machine), the terminal may receive a transaction instruction sent by the card reader (or the POS machine). If an NFC application accessed by the transaction instruction is carried in the SE 1, the terminal may automatically activate the corresponding NFC application, to complete a transaction. If the NFC application accessed by the transaction instruction is not carried in the SE 1, but is carried in the SE 2 or the SE 3, the terminal cannot automatically activate the NFC application accessed by the transaction instruction. In this case, the transaction can be completed when a user manually activates the corresponding NFC application.

This embodiment provides a method for automatically activating an NFC application. The method may be applied to a terminal having a plurality of SEs, and the terminal has an NFC function. According to the method provided in this embodiment, when the terminal has the plurality of SEs, an NFC application to be accessed by a transaction instruction can be automatically activated.

For example, the terminal in this embodiment may be a device such as a mobile phone, a tablet computer, a desktop computer, a laptop computer, a handheld computer, a notebook computer, an ultra-mobile personal computer (Ultra-mobile Personal Computer, UMPC), a netbook, a cellular phone, a personal digital assistant (Personal Digital Assistant, PDA), a wearable device (for example, a smartwatch), or an augmented reality (augmented reality, AR)/virtual reality (virtual reality, VR) device. A specific form of the device is not particularly limited in this embodiment.

Figure 2:
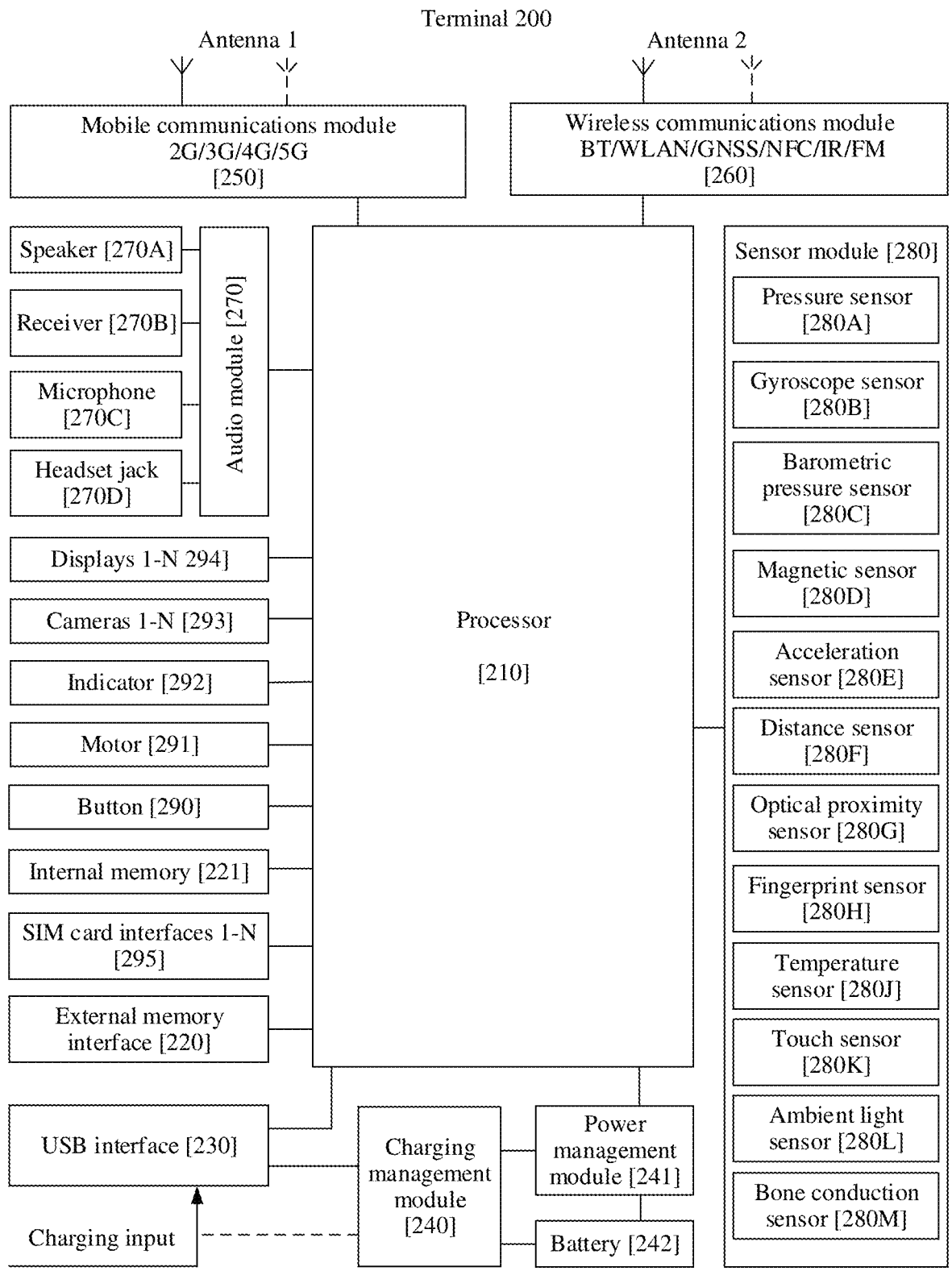
FIG. 2 is a schematic structural diagram of a terminal according to an embodiment of this application.

FIG. 2 is a schematic structural diagram of a terminal 200 provided in this embodiment.

As shown in FIG. 2, the terminal 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment does not constitute a specific limitation on the terminal 200. In some other embodiments, the terminal 200 may include more or fewer components than those shown in the figure, or some components may be combined, or some components may be split, or different component arrangements may be used. The components shown in the figure may be implemented by hardware, software, or a combination of software and hardware.

The processor 210 may include one or more processing units. For example, the processor 210 may include an AP, a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent devices, or may be integrated into one or more processors.

In some embodiments, the terminal 200 may include an SE existing in a form of an AP, and the SE may be referred to as an inSE.

The controller may be a nerve center and a command center of the terminal 200. The controller may generate an operation control signal based on instruction operation code and a time sequence signal, to complete control of fetch instruction and execution instruction.

A memory may be further disposed in the processor 210, and is configured to store an instruction and data. In some embodiments, the memory in the processor 210 is a cache memory. The memory may store an instruction or data that is just used or cyclically used by the processor 210. If the processor 210 uses the instruction or the data again, the processor 210 may directly invoke the instruction or the data from the memory. This avoids repeated access and reduces a waiting time of the processor 210. Therefore, system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 210 may include a plurality of groups of I2C buses. The processor 210 may be coupled to the touch sensor 280K, a charger, a flash, the camera 293, and the like by using different I2C bus interfaces. For example, the processor 210 may be coupled to the touch sensor 280K through the I2C interface, so that the processor 210 communicates with the touch sensor 280K through the I2C bus interface, to implement a touch function of the terminal 200.

The I2S interface may be used for audio communication. In some embodiments, the processor 210 may include a plurality of groups of I2S buses. The processor 210 may be coupled to the audio module 270 by using the I2S bus, to implement communication between the processor 210 and the audio module 270. In some embodiments, the audio module 270 may transfer an audio signal to the wireless communications module 260 by using the I2S interface, to implement a function of answering a call by using a Bluetooth headset.

The PCM interface may also be used for audio communication, to sample, quantize, and encode an analog signal. In some embodiments, the audio module 270 may be coupled to the wireless communications module 260 by using the PCM bus interface. In some embodiments, the audio module 270 may alternatively transfer an audio signal to the wireless communications module 260 by using the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and switches to-be-transmitted data between serial communication and parallel communication. In some embodiments, the UART interface is usually configured to connect the processor 210 and the wireless communications module 260. For example, the processor 210 communicates with a Bluetooth module in the wireless communications module 260 by using the UART interface, to implement a Bluetooth function. In some embodiments, the audio module 270 may transfer an audio signal to the wireless communications module 260 by using the UART interface, to implement a function of playing music by using a Bluetooth headset.

The MIPI interface may be configured to connect the processor 210 and a peripheral component such as the display 294 or the camera 293. The MIPI interface includes a camera serial interface (camera serial interface, CSI), a display serial interface (display serial interface, DSI), and the like. In some embodiments, the processor 210 communicates with the camera 293 through the CSI interface, to implement a photographing function of the terminal 200. The processor 210 communicates with the display 294 through the DSI interface, to implement a display function of the terminal 200.

The GPIO interface may be configured through software. The GPIO interface may be configured as a control signal or a data signal. In some embodiments, the GPIO interface may be configured to connect the processor 210 to the camera 293, the display 294, the wireless communications module 260, the audio module 270, the sensor module 280, or the like. The GPIO interface may alternatively be configured as an I2C interface, an I2S interface, a UART interface, an MIPI interface, or the like.

The USB interface 230 is an interface that conforms to a USB standard specification, and may be specifically a mini USB interface, a micro USB interface, a USB Type-C interface, or the like. The USB interface 230 may be configured to connect to the charger to charge the terminal 200, or may be configured to transmit data between the terminal 200 and a peripheral device, or may be configured to connect to a headset to play audio by using the headset. The interface may be further configured to connect to another terminal such as an AR device.

It may be understood that an interface connection relationship between the modules shown in this embodiment is merely an example for description, and does not constitute a limitation on the structure of the terminal 200. In some other embodiments, the terminal 200 may alternatively use an interface connection manner different from that in the foregoing embodiment, or a combination of a plurality of interface connection manners.

The charging management module 240 is configured to receive charging input from a charger. The charger may be a wireless charger or a wired charger. In some embodiments of wired charging, the charging management module 240 may receive a charging input of the wired charger by using the USB interface 230. In some embodiments of wireless charging, the charging management module 240 may receive wireless charging input via a wireless charging coil of the terminal 200. The charging management module 240 may further supply power to the terminal by using the power management module 241 while charging the battery 242.

The power management module 241 is configured to connect the battery 242 and the charging management module 240 to the processor 210. The power management module 241 receives an input of the battery 242 and/or the charging management module 240, and supplies power to the processor 210, the internal memory 221, an external memory, the display 294, the camera 293, the wireless communications module 260, and the like. The power management module 241 may be further configured to monitor parameters such as a battery capacity, a battery cycle count, and a battery health status (electric leakage or impedance). In some other embodiments, the power management module 241 may alternatively be disposed in the processor 210. In some other embodiments, the power management module 241 and the charging management module 240 may alternatively be disposed in a same device.

A wireless communication function of the terminal 200 may be implemented through the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the terminal 200 may be configured to cover one or more communication bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 250 may provide a wireless communication solution that includes 2G/3G/4G/5G or the like and that is applied to the terminal 200. The mobile communications module 250 may include at least one filter, a switch, a power amplifier, a low noise amplifier (low noise amplifier, LNA), and the like. The mobile communications module 250 may receive an electromagnetic wave by using the antenna 1, perform processing such as filtering or amplification on the received electromagnetic wave, and transfer the electromagnetic wave to the modem processor for demodulation. The mobile communications module 250 may further amplify a signal modulated by the modem processor, and convert the signal into an electromagnetic wave for radiation by using the antenna 1. In some embodiments, at least some function modules in the mobile communications module 250 may be disposed in the processor 210. In some embodiments, at least some function modules in the mobile communications module 250 may be disposed in a same device as at least some modules in the processor 210.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to an application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and is disposed in a same device as the mobile communications module 250 or another function module.

The wireless communications module 260 may provide wireless communication solutions applied to the terminal 200, including NFC, a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), and frequency modulation (frequency modulation, FM), and an infrared (infrared, IR) technology. The wireless communications module 260 may be one or more devices integrating at least one communications processing module. The wireless communications module 260 receives an electromagnetic wave through the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2. In some embodiments, the wireless communications module 260 may be specifically an NFC chip, and the NFC chip may include a DH and an NFCC. The NFC chip can perform processing such as amplification, analog-to-digital conversion, digital-to-analog conversion, and storage on a signal.

In some embodiments, the antenna 1 and the mobile communications module 250 of the terminal 200 are coupled, and the antenna 2 and the wireless communications module 260 are coupled, so that the terminal 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or satellite based augmentation systems (satellite based augmentation systems, SBAS).

The terminal 200 implements the display function through the GPU, the display 294, the application processor, and the like. The GPU is a microprocessor for image processing, and is connected to the display 294 and the application processor. The GPU is configured to perform mathematical and geometric calculation, and render an image. The processor 210 may include one or more GPUs that execute a program instruction to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the terminal 200 may include one or N displays 294, where N is a positive integer greater than 1.

The terminal 200 can implement a photographing function by using the ISP, the camera 293, the video codec, the GPU, the display 294, the application processor, and the like.

The ISP is configured to process data fed back by the camera 293. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format. In some embodiments, the terminal 200 may include one or N cameras 293, where N is a positive integer greater than 1.

The digital signal processor is configured to process digital signals, and may process another digital signal in addition to the digital image signal. For example, when the terminal 200 selects a frequency, the digital signal processor is configured to perform Fourier transform and the like on frequency energy.

The video codec is configured to compress or decompress a digital video. The terminal 200 may support one or more video codecs. In this way, the terminal 200 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the terminal 200, such as image recognition, facial recognition, speech recognition, and text understanding, can be implemented through the NPU.

The external memory interface 220 may be configured to be connected to an external storage card such as a micro SD card, to extend a storage capability of the terminal 200. The external storage card communicates with the processor 210 through the external memory interface 220, to implement a data storage function. For example, music and videos are stored in the external storage card. In some embodiments, the terminal 200 may include an SE existing in a form of an external memory card.

The internal memory 221 may be configured to store computer executable program code, where the executable program code includes an instruction. The processor 210 runs the instruction stored in the internal memory 221, to implement various function applications and data processing of the terminal 200. The internal memory 221 may include a program storage area and a data storage area. The program storage area may store an operating system, an application required by at least one function (for example, a sound playing function or an image playing function), and the like. The data storage area may store data (such as audio data and a phone book) created during use of the terminal 200, and the like. In addition, the internal memory 221 may include a high-speed random access memory, and may further include a nonvolatile memory, for example, at least one magnetic disk storage device, a flash storage device, or a universal flash storage (universal flash storage, UFS).

The terminal 200 may implement an audio function such as music playback or recording through the audio module 270, the speaker 270A, the receiver 270B, the microphone 270C, the headset jack 270D, the application processor, and the like.

The audio module 270 is configured to convert digital audio information into an analog audio signal for output, and is also configured to convert analog audio input into a digital audio signal. The audio module 270 may be further configured to: code and decode an audio signal. In some embodiments, the audio module 270 may be disposed in the processor 210, or some function modules in the audio module 270 are disposed in the processor 210.

The speaker 270A, also referred to as a "horn", is configured to convert an audio electrical signal into a sound signal. The terminal 200 may be used to listen to music or answer a hands-free call through the speaker 270A.

The receiver 270B, also referred to as an "earpiece", is configured to convert an audio electrical signal into a sound signal. When a call is answered or an audio message is received through the terminal 200, the receiver 270B may be put close to a human ear to listen to voice.

The microphone 270C, also referred to as a "mike" or a "microphone", is configured to convert a sound signal into an electrical signal. When making a call or sending voice information, a user may make a sound by moving a human mouth close to the microphone 270C to input a sound signal to the microphone 270C. At least one microphone 270C may be disposed in the terminal 200. In some other embodiments, two microphones 270C may be disposed in the terminal 200, to collect a sound signal and further implement a noise reduction function. In some other embodiments, three, four, or more microphones 270C may alternatively be disposed in the terminal 200, to collect a sound signal, reduce noise, further identify a sound source, implement a directional recording function, and the like.

The headset jack 270D is configured to connect to a wired headset. The headset jack 270D may be the USB interface 230, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 280A is configured to sense a pressure signal, and can convert the pressure signal into an electrical signal. In some embodiments, the pressure sensor 280A may be disposed on the display 294. There are many types of pressure sensors 280A such as a resistive pressure sensor, an inductive pressure sensor, and a capacitive pressure sensor. The capacitive pressure sensor may include at least two parallel plates made of conductive materials. Capacitance between electrodes changes when a force is performed on the pressure sensor 280A. The terminal 200 determines pressure strength based on a capacitance change. When a touch operation is performed on the display 294, the terminal 200 detects strength of the touch operation through the pressure sensor 280A. The terminal 200 may also calculate a touch position based on a detection signal of the pressure sensor 280A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyroscope sensor 280B may be configured to determine a moving posture of the terminal 200. In some embodiments, an angular velocity of the terminal 200 around three axes (namely, axes x, y, and z) may be determined through the gyroscope sensor 280B. The gyroscope sensor 280B may be used for image stabilization during photographing. For example, when the shutter is pressed, the gyroscope sensor 280B detects an angle at which the terminal 200 jitters, calculates, based on the angle, a distance for which a lens module compensates, and allows the lens to cancel the jitter of the terminal 200 through reverse motion, to implement image stabilization. The gyro sensor 280B may also be used in navigation and somatic game scenarios.

The barometric pressure sensor 280C is configured to measure atmospheric pressure. In some embodiments, the terminal 200 calculates an altitude through a barometric pressure value measured by the barometric pressure sensor 280C, to assist positioning and navigation.

The magnetic sensor 280D includes a Hall sensor. The terminal 200 may detect opening and closing of a flip leather case through the magnetic sensor 280D. In some embodiments, when the terminal 200 is a clamshell phone, the terminal 200 may detect opening and closing of a flip cover through the magnetic sensor 280D. Further, based on a detected opening or closing state of the leather case or a detected opening or closing state of the flip cover, features such as automatic unlocking upon opening of the flip cover are set.

The acceleration sensor 280E may detect values of accelerations in various directions (usually on three axes) of the terminal 200. When the terminal 200 is still, a value and a direction of gravity may be detected. The acceleration sensor 180E may be further configured to identify a posture of the terminal, and is applied to an application such as switching between a landscape mode and a portrait mode or a pedometer.

The distance sensor 280F is configured to measure a distance. The terminal 200 may measure a distance through infrared light or a laser. In some embodiments, in a shooting scenario, the terminal 200 may use the range sensor 280F to measure a distance, to implement quick focusing.

For example, the optical proximity sensor 280G may include a light-emitting diode (LED) and an optical detector, for example, a photodiode. The light-emitting diode may be an infrared light-emitting diode. The terminal 200 emits infrared light by using the light-emitting diode. The terminal 200 detects infrared reflected light from a nearby object by using the photodiode. When sufficient reflected light is detected, it may be determined that there is an object near the terminal 200. When insufficient reflected light is detected, the terminal 200 may determine that there is no object near the terminal 200. The terminal 200 may detect, through the optical proximity sensor 280G, that the user holds the terminal 200 close to an ear to make a call, to automatically turn off a screen for power saving. The optical proximity sensor 280G may also be used in a leather case mode or a pocket mode to automatically unlock or lock the screen.

The ambient light sensor 280L is configured to sense ambient light brightness. The terminal 200 may adaptively adjust brightness of the display 294 based on the sensed ambient light brightness. The ambient light sensor 280L may also be configured to automatically adjust a white balance during photographing. The ambient light sensor 280L may further cooperate with the optical proximity sensor 280G to detect whether the terminal 200 is in a pocket to prevent an accidental touch.

The fingerprint sensor 280H is configured to collect a fingerprint. The terminal 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the terminal 200 executes a temperature processing policy based on the temperature detected by the temperature sensor 280J. For example, when the temperature reported by the temperature sensor 280J exceeds a threshold, the terminal 200 lowers performance of a processor located near the temperature sensor 280J, to reduce power consumption to implement thermal protection. In some other embodiments, when the temperature is lower than another threshold, the terminal 200 heats the battery 242 to prevent the terminal 200 from being shut down abnormally because of a low temperature. In some other embodiments, when the temperature is lower than still another threshold, the terminal 200 boosts an output voltage of the battery 242 to avoid abnormal shutdown caused by a low temperature.

The touch sensor 280K is also referred to as a "touch panel". The touch sensor 280K may be disposed on the display 294. The touch sensor 280K and the display 294 form a touchscreen, which is also referred to as a "touchscreen". The touch sensor 280K is configured to detect a touch operation performed on or near the touch sensor 280K. The touch sensor may transfer the detected touch operation to the application processor, to determine a type of a touch event. Visual output related to the touch operation may be provided by using the display 294. In some other embodiments, the touch sensor 280K may alternatively be disposed on a surface of the terminal 200 at a location different from that of the display 294.

The bone conduction sensor 280M may obtain a vibration signal. In some embodiments, the bone conduction sensor 280M may obtain a vibration signal of a vibration bone of a human vocal part. The bone conduction sensor 280M may also contact a body pulse to receive a blood pressure beating signal. In some embodiments, the bone conduction sensor 280M may also be disposed in the headset, to combine into a bone conduction headset. The audio module 270 may obtain a voice signal through parsing based on the vibration signal that is of the vibration bone of the vocal part and that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, and the like. The button 290 may be a mechanical button, or may be a touch button. The terminal 200 may receive button input, and generate button signal input related to a user setting and function control of the terminal 200.

The motor 291 may generate a vibration prompt. The motor 291 may be used for an incoming call vibration prompt, or may be used for a touch vibration feedback. For example, touch operations performed on different applications (for example, a photographing application and an audio playing application) may correspond to different vibration feedback effects. The motor 291 may also correspond to different vibration feedback effects for touch operations performed on different areas of the display 294. Different application scenarios (for example, time reminding, information receiving, an alarm clock, and a game) may also correspond to different vibration feedback effects. A touch vibration feedback effect may further be customized.

The indicator 292 may be an indicator light, and may be configured to indicate a charging status and a power change, or may be configured to indicate a message, a missed call, a notification, and the like.

The SIM card interface 295 is configured to connect to a SIM card. A SIM card may be inserted into the SIM card interface 295 or removed from the SIM card interface 295, to implement contact with or separation from the terminal 200. The terminal 200 may support one or N SIM card interfaces, where N is a positive integer greater than 1. The SIM card interface 295 may support a nano SIM card, a micro SIM card, a SIM card, and the like. A plurality of cards may be simultaneously inserted into a same SIM card interface 295. The plurality of cards may be of a same type or of different types. The SIM card interface 295 may also be compatible with different types of SIM cards. The SIM card interface 295 may also be compatible with the external storage card. The terminal 200 interacts with a network via the SIM card, to implement functions such as calling and data communication. In some embodiments, the terminal 200 uses an eSIM, namely, an embedded SIM card. The eSIM card may be embedded in the terminal 200, and cannot be separated from the terminal 200. In some embodiments, the terminal 200 may include an SE existing in a form of a SIM card.

For example, all technical solutions in the following embodiments may be implemented in the terminal 200 having the foregoing hardware architecture. The following describes in detail the method for automatically activating an NFC application provided in this embodiment. For ease of understanding, the following embodiments are described by using an example in which the terminal has three SEs (as shown in FIG. 1).

In some embodiments of this application, in a scenario in which the terminal has a plurality of SEs (for example, three SEs), one SE is in an active state by default. In this embodiment, some specific NFC applications may be carried in the SE that is in an active state by default. In this way, after receiving a transaction instruction, the terminal can automatically activate an NFC application accessed by the transaction instruction. The foregoing SE that is in an active state by default may be a first SE in this application.

In some embodiments, the foregoing specific NFC application may be an NFC application that supports AID identification. In other words, all NFC applications that support AID identification may be carried in the SE that is in an active state by default in the terminal.

For example, with reference to FIG. 1, the SE 1 that exists in the form of the SIM card is in an active state by default. When an NFC application (for example, the NFC application may be a first NFC application in this application) is being downloaded, if the NFC application is an NFC application that supports AID identification, the terminal may download the NFC application to the SE 1.

In a possible implementation, the terminal may store an identifier of an NFC application that supports AID identification. For example, a whitelist is stored in the terminal. The whitelist includes AIDs of all NFC applications that support AID identification. In some embodiments, when downloading an NFC application, the terminal may determine whether an AID of the downloaded NFC application is included in the whitelist. If the AID of the downloaded NFC application is included in the whitelist, the terminal downloads the NFC application to the SE that is in an active state by default. For example, the whitelist stored in the terminal is shown in Table 1. It may be learned from Table 1 that NFC applications whose AIDs are an AID 1, an AID 2, an AID 3, and an AID 4 are NFC applications that support AID identification.

TABLE 1

| Whitelist |
| --- |
| AID 1 |
| AID 2 |
| AID 3 |
| AID 4 |

For example, a currently downloaded NFC application is a bus card application of Xi'an, and an AID of the bus card application is the AID1. The terminal may determine that the AID of the bus card application is included in the whitelist, and the bus card application is an NFC application that supports AID identification. The terminal may download the bus card application to the SE 1.

For another example, when downloading an NFC application, a user may manually select an SE to which the NFC application is to be downloaded. The SE that is selected by the user and to which the NFC application is to be downloaded is not the SE that is in an active state by default. The SE that is not in an active state by default may be a second SE in this application. After an NFC application (for example, the NFC application may be a second NFC application in this application) is downloaded, the terminal may determine whether an AID of the NFC application is included in the whitelist. If the AID of the NFC application is included in the whitelist, the NFC application may be transferred from a current SE to the SE that is in an active state by default. In some embodiments, after the terminal transfers the NFC application from the current SE to the SE that is in an active state by default, the terminal may further display prompt information. The prompt information is used to indicate the user that the NFC application has been transferred to the SE that is in an active state by default, so that the NFC application can be automatically activated during subsequent use. Alternatively, if the SE that is selected by the user and to which the NFC application is to be downloaded is not the SE that is in an active state by default, the terminal may determine whether the AID of the NFC application is included in the whitelist. If the AID of the NFC application is included in the whitelist, the terminal downloads the NFC application to the SE that is in an active state by default, instead of the SE selected by the user. In some embodiments, the terminal may alternatively display prompt information to indicate the user that the NFC application is downloaded to the SE that is in an active state by default, instead of the SE selected by the user, so that the NFC application can be automatically activated during subsequent use.

For an NFC application that has been downloaded to an SE of the terminal (for example, the NFC application may also be the second NFC application in this application), for example, an NFC application that has been downloaded to the SE of the terminal at delivery, if the NFC application is not downloaded to the SE that is in an active state by default, the terminal may determine whether an AID of the NFC application is included in the whitelist. If it is determined that the AID of the NFC application is included in the whitelist, the terminal may transfer the NFC application from a current SE to the SE that is in an active state by default. For example, with reference to the foregoing example and Table 1, the terminal downloads a bank card application of a bank to the SE 2 of the terminal at delivery, and an AID of the bank card application is the AID 2. The terminal determines that the AID 2 of the bank card application is included in the whitelist stored in the terminal. The terminal may transfer the bank card application from the SE 2 to the SE 1.

Then, when the terminal approaches a card reader or a POS machine, the terminal may receive a transaction instruction (for example, the transaction instruction may be a first transaction instruction in this application). The transaction instruction may include an AID. The terminal may find, based on the AID included in the transaction instruction, a corresponding NFC application from the SE that is in an active state by default, and automatically activate the NFC application. For example, when the user approaches the card reader (or the POS machine) by holding the terminal, the card reader (or the POS machine) may send the transaction instruction that carries the AID. The NFCC of the terminal may receive the transaction instruction. The NFCC of the terminal may send the received transaction instruction to the SE (for example, the SE 1) that is in an active state by default. After receiving the transaction instruction, the SE that is in an active state by default may automatically run, based on the AID carried in the transaction instruction, the NFC application identified by the AID, and execute the transaction instruction.

For example, with reference to the foregoing example, when downloading the bus card application of Xi'an, the terminal downloads the bus card application to the SE 1 that is in an active state by default. The AID of the bus card application of Xi'an is the AID 1. When the user approaches a POS machine on a Xi'an bus by holding the terminal, the POS machine may send a transaction instruction that carries the AID 1, where the transaction instruction is used to indicate to deduct 1 yuan from an amount of a bus card of the user. When receiving the transaction instruction, the NFCC of the terminal may send the transaction instruction to the SE 1. The SE 1 may determine, based on the AID 1 carried in the received transaction instruction, that an NFC application accessed by the POS machine is the bus card application of Xi'an. The SE 1 may automatically run the bus card application of Xi'an and deduct 1 yuan.

For another example, with reference to the foregoing example, the terminal transfers, to the SE 1 that is in an active state by default, the bank card application that is downloaded to the SE 2 by default at delivery. The AID of the bank card application is the AID 2. When the user approaches the POS machine by holding the terminal, the POS machine may send a transaction instruction that carries the AID 2, where the transaction instruction is used to indicate to deduct 268 yuan from an amount of a bank card of the user. When receiving the transaction instruction, the NFCC of the terminal may send the transaction instruction to the SE 1. The SE 1 may determine, based on the AID 2 carried in the received transaction instruction, that an NFC application accessed by the POS machine is the bank card application. The SE 1 may automatically run the bank card application and deduct 268 yuan.

In this embodiment, if an NFC application is not an NFC application that supports AID identification, the terminal may download the NFC application to the SE 1, or may download the NFC application to another SE of the terminal, for example, the SE 2 or the SE 3.

In some other embodiments, the foregoing specific NFC application may be an NFC application frequently used by the user. In other words, all NFC applications frequently used by the user may be carried in the SE that is in an active state by default in the terminal. The SE that is in an active state by default may be a first SE in this application.

For example, the terminal may obtain use frequency of an NFC application in the terminal. For example, the terminal may collect statistics on a quantity of times that the user manually activates the NFC application in a period of time, to obtain the use frequency of the NFC application. If the terminal learns that use frequency of an NFC application is greater than a predetermined threshold, but the NFC application is not currently carried in the SE that is in an active state by default, the terminal may transfer the NFC application from a current SE to the SE that is in an active state by default.

For example, the terminal may further collect statistics on information such as a time and/or a geographical location at which the user frequently uses the NFC application, so that when a transaction instruction (for example, the transaction instruction may be a second transaction instruction in this application) is subsequently received, it may be determined, based on the information, whether the user's current intention of using the terminal is to use the NFC application. When it is determined that the user's intention of using the terminal is to use the NFC application, the NFC application may be automatically activated. In some embodiments, the terminal may obtain the geographical location by using various positioning technologies. For example, the terminal may obtain the geographical location of the user by using a GPS in the terminal.

Figure 3:
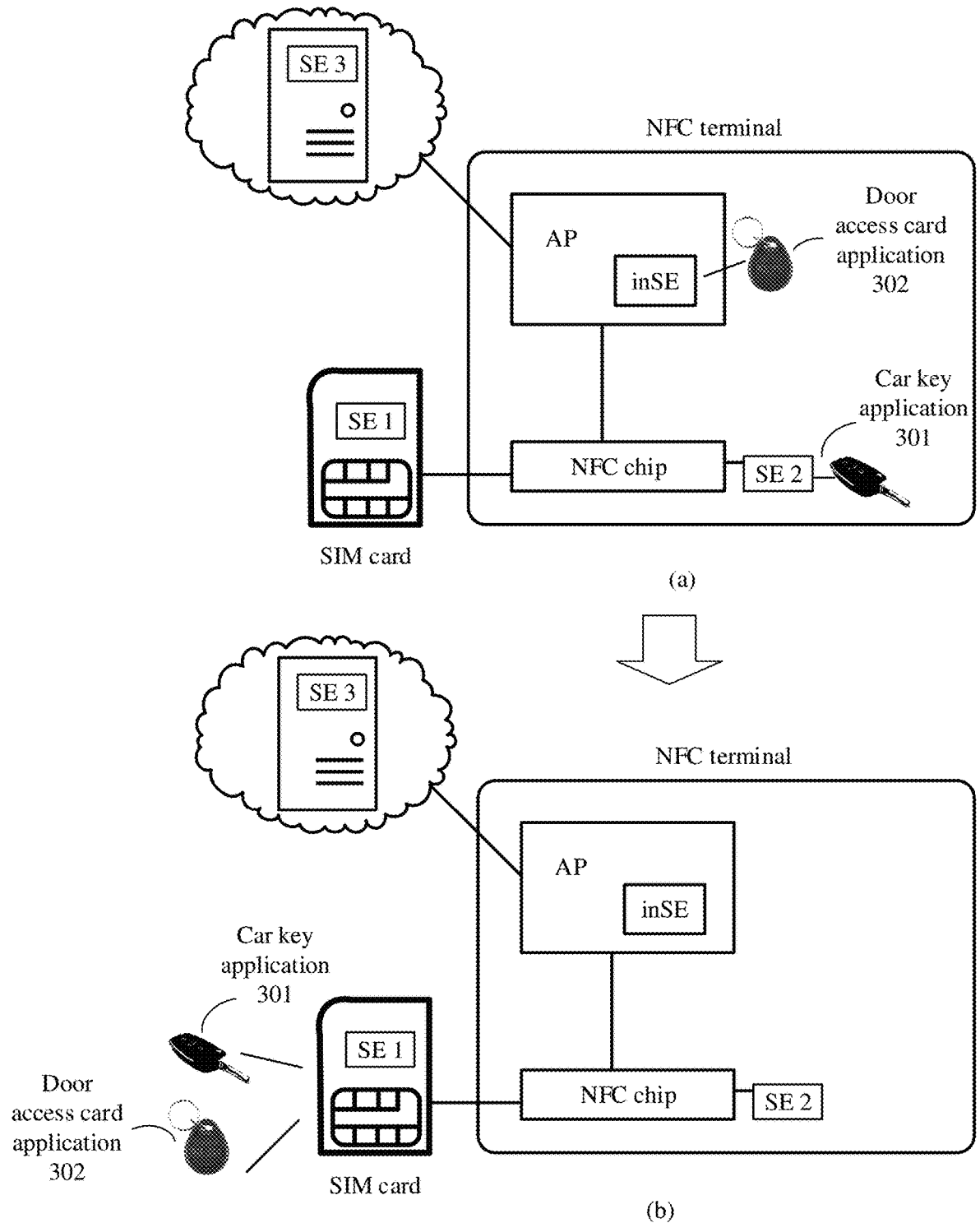
FIG. 3 is a schematic diagram of distribution of an NFC application in an SE of a terminal according to an embodiment of this application.

For example, with reference to FIG. 1, the SE 1 in the form of the SIM card is in an active state by default. As shown in (a) in FIG. 3, an NFC application such as a car key application 301 is carried in the SE 2 that is encapsulated with the NFC chip in the terminal. The terminal learns, based on a quantity of times that the user manually activates the car key application 301 in a period of time, that use frequency of the car key application 301 is frequency 1. The terminal determines whether the frequency 1 is greater than the predetermined threshold. If the frequency 1 is greater than the predetermined threshold, the terminal may transfer the car key application 301 from the SE 2 to the SE 1 that is in an active state by default, as shown in (b) in FIG. 3. In addition, the terminal further learns, through statistics collection, that the car key application 301 is frequently used by the user in a time period from 7:30 to 7:50. If the terminal receives a transaction instruction, the terminal may automatically activate the car key application 301 when learning that a current system time (or a time at which the transaction instruction is received) is in the time period from 7:30 to 7:50. In other words, when the current system time is in the time period from 7:30 to 7:50, the SE 1 that is in an active state by default may automatically run the car key application 301. Therefore, when the user approaches a car door by using a mobile phone, the car door may be opened without manually activating the car key application 301 by the user.

For another example, with reference to FIG. 1, the SE 1 in the form of the SIM card is in an active state by default. As shown in (a) in FIG. 3, an NFC application such as a door access card application 302 is carried in the inSE that exists in the form of the AP of the terminal in the terminal. The terminal learns, based on a quantity of times that the user manually activates the door access card application 302 in a period of time, that use frequency of the door access card application 302 is frequency 2. The terminal determines whether the frequency 2 is greater than the predetermined threshold. If the frequency 2 is greater than the predetermined threshold, the terminal may transfer the door access card application 302 from the inSE to the SE 1 that is in an active state by default, as shown in (b) in FIG. 3. In addition, the terminal further learns, through statistics collection, that the door access card application 302 is frequently used by the user in a specified geographical location range (for example, the geographical location range is a home of the user) in a time period from 18:00 to 18:30. If the terminal receives a transaction instruction, the terminal may automatically activate the door access card application 302 when it is learned that a current system time (or a time at which the transaction instruction is received) is in the time period from 18:00 to 18:30 and a current geographical location (or a geographical location at which the transaction instruction is received) is within the geographical location range. In other words, when the current system time is in the period from 18:00 to 18:30 and the current geographical location is within the geographical location range, the SE 1 that is in an active state by default may automatically run the door access card application 302. Therefore, when the user approaches a room door by using a mobile phone, the room door may be opened without manually activating the door access card application 302 by the user.

Certainly, for an NFC application carried in the SE that is in an active state by default, the terminal may also collect statistics on information such as a time and/or a geographical location at which the user frequently uses the NFC application, so that it can be subsequently determined, based on the information, whether the user's current intention of using the terminal is to use the NFC application. If yes, the NFC application may be automatically activated.

For another example, when downloading an NFC application, the terminal may correspondingly store related information about the NFC application and a handle of the NFC application in a routing table of the SE that is in an active state by default. After receiving a transaction instruction, the terminal may determine, based on the routing table from NFC applications carried in the SE that is in an active state by default, an NFC application accessed by the transaction instruction and automatically activate the NFC application, to complete a transaction. It should be noted that, for a specific process of determining, based on the routing table, the NFC application accessed by the transaction instruction, refer to specific descriptions of corresponding content in the following embodiment. Details are not described herein.

In some other embodiments of this application, in a scenario in which the terminal has a plurality of SEs (for example, three SEs), one SE is in an active state by default, and other SEs are in an inactive state. In this embodiment, the terminal may automatically activate a corresponding NFC application based on a scenario in which the user uses the NFC application.

For example, with reference to FIG. 1, the SE 1 that exists in the form of the SIM card is in an active state by default, and the SE 2 and the SE 3 are in an inactive state. After receiving a transaction request, the NFCC of the terminal may determine, based on a use scenario, an NFC application accessed by the transaction request. If the NFC application accessed by the transaction request is carried in the SE 1, the NFCC of the terminal may transmit the received transaction request to the SE 1, so that the SE 1 automatically activates the corresponding NFC application, to complete a transaction. If the NFC application accessed by the transaction request is not carried in the SE 1, but is carried in an SE that is in an inactive state, for example, in the SE 2, the terminal may deactivate the SE 1 and activate the SE 2. In this case, the NFCC of the terminal may transmit the received transaction request to the SE 2 that is currently in an active state. The SE 2 may automatically activate the corresponding NFC application according to the received transaction instruction, to complete a transaction.

For example, with reference to FIG. 1, the SE 1 that exists in the form of the SIM card is in an active state by default, and the SE 2 and the SE 3 are in an inactive state. The SE 1 of the terminal carries a bus card application of Shenzhen, and the SE 2 carries a bus card application of Xi'an. The terminal may automatically activate a corresponding NFC application based on a geographical location of the user. When the user approaches a POS machine on a bus by holding the terminal, the NFCC of the terminal may receive a transaction instruction sent by the POS machine. After receiving the transaction instruction, the terminal may obtain a current geographical location of the user. If the obtained geographical location indicates that the user is currently in Shenzhen, the NFCC of the terminal may transmit the received transaction instruction to the SE 1. In this case, the SE 1 automatically activates the bus card application of Shenzhen, and executes the transaction instruction, for example, deducts a corresponding amount from the bus card application. If the obtained geographical location indicates that the user is currently in Xi'an, the terminal may deactivate the SE 1 and activate the SE 2. The NFCC of the terminal may transmit the received transaction instruction to the SE 2. After receiving the transaction instruction, the SE 2 may automatically activate the bus card application of Xi'an, and execute the transaction instruction, to complete a transaction.

In some other embodiments of this application, in a scenario in which the terminal downloads a plurality of NFC applications, the terminal may determine, based on recommendation information sent by a server deployed in the Internet, an NFC application to be automatically activated, and automatically activate the NFC application. The recommendation information sent by the server may be determined based on information reported by a terminal of another user, and the information may be used to indicate that the terminal uses a specified NFC application in a specified scenario. Generally, most users use a specified NFC application at a specified time in a specified place. Terminals of these users may report, to the server, information used to indicate that the NFC application is used at the specified time in the specified place. After the user arrives at the specified place at the specified time, the terminal of the user may receive a push message sent by the server, where the push message is used to indicate the terminal to recommend the corresponding to-be-used NFC application to the user. The terminal may automatically activate the corresponding NFC application based on the push message.

Figure 4:
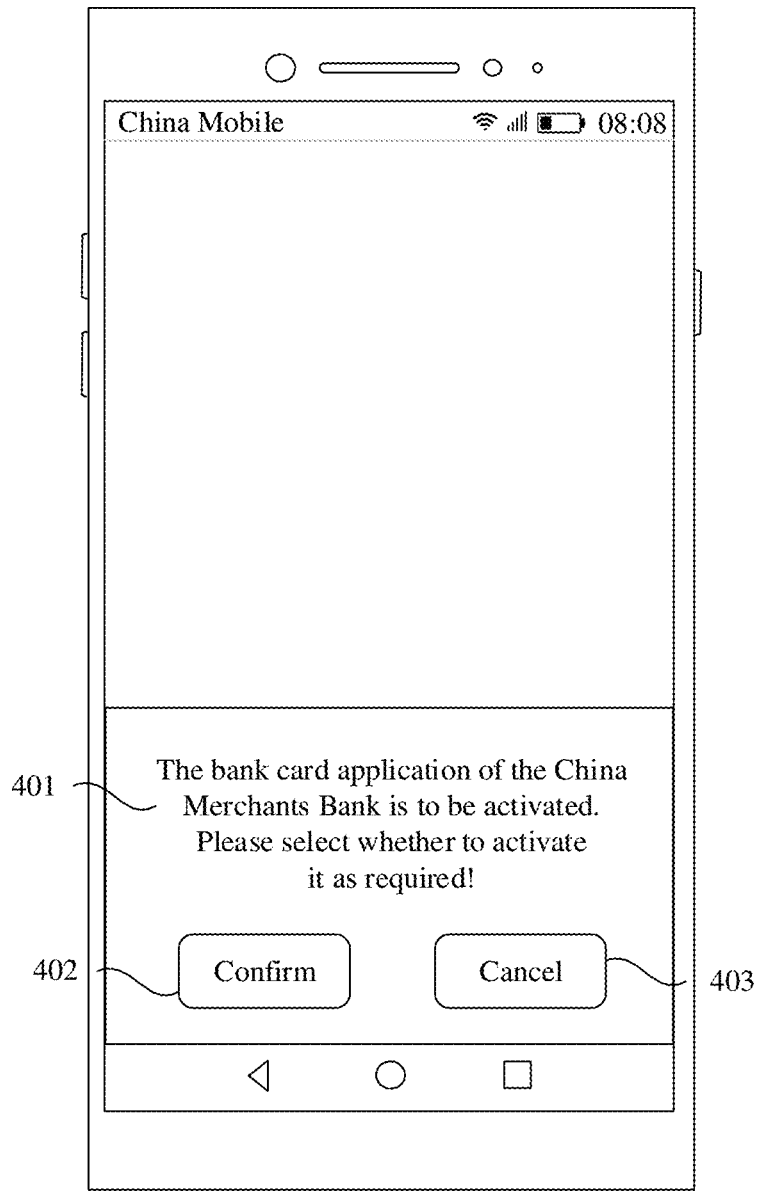
FIG. 4 is a schematic diagram of a display interface of a terminal according to an embodiment of this application.

For example, the server determines the Starbucks in a specified place based on information reported by most users, and everyone uses a bank card application of the China Merchants Bank. A terminal of a specified user downloads the bank card application of the China Merchants Bank. When the user arrives at the Starbucks in the specified place, the terminal may receive a push message sent by the server, and the terminal may automatically activate the bank card application of the China Merchants Bank in the terminal based on the push message. In some embodiments, as shown in FIG. 4, after receiving the push message, the terminal may display a prompt window. The prompt window includes prompt information 401, and the prompt information 401 is used to prompt the user to automatically activate the bank card application of the China Merchants Bank. In some embodiments, the prompt window may further include a confirm button 402 and a cancel button 403. When the user wants to use the bank card application of the China Merchants Bank, the user may perform a tap operation on the confirm button 402. The terminal may automatically activate the application in response to the tap operation. If the user does not want to use the bank card application of the China Merchants Bank, the user may perform a tap operation on the cancel button 403. The terminal does not activate the application in response to the tap operation. In some embodiments, when the bank card application of the China Merchants Bank is carried in an SE that is in an inactive state, after receiving the push message, the terminal may first activate the SE that carries the bank card application.

In some other embodiments of this application, in a scenario in which the terminal has a plurality of SEs (for example, three SEs), after the user approaches a card reader (or a POS machine) by holding the terminal, the terminal may receive a transaction instruction sent by the card reader (or the POS machine). The terminal determines, according to the received transaction instruction, which SE in the plurality of SEs of the terminal carries an NFC application accessed by the transaction instruction. For example, the SE that carries the NFC application accessed by the transaction instruction is referred to as a target SE. After the target SE is determined, the received transaction instruction may be transmitted to the target SE. The target SE may determine, according to the received transaction instruction from an NFC application carried in the target SE, the NFC application accessed by the transaction instruction. For example, the NFC application accessed by the transaction instruction is referred to as a target NFC application. The target SE may automatically activate the target NFC application. In other words, the target SE may automatically run the target NFC application, and execute the transaction instruction of the card reader (or the POS machine), to complete a transaction.

In this embodiment, the transaction instruction may be an instruction sent by any type of card reader (for example, a handheld mobile card reader or a fixed card reader) or any type of POS machine (for example, a handheld mobile POS machine or a fixed POS machine). The transaction instruction may be instructions of various types or various frame formats. For example, the transaction instruction may be an instruction of a frame format such as an application protocol data unit (Application Protocol Data Unit, APDU) frame format, a single-byte short frame format, or a long frame format. For another example, the transaction instruction may be an instruction of a type such as a 14443 type (TYPE) A or a 14443 type B, international standard organization (International Standard Organization, ISO) 18092, or ISO15693.

In some embodiments, if the target SE determined by the terminal is in an active state, after determining the target SE, the terminal may transmit the received transaction instruction to the target SE. If the target SE determined by the terminal is in an inactive state, after determining the target SE, the terminal may activate the target SE, and then transmit the received transaction instruction to the target SE. Certainly, if the target SE is in an inactive state and another SE of the terminal is in an active state, the terminal may further deactivate the another SE that is in an active state.

In some embodiments, the terminal may determine, based on a first routing table maintained by the terminal, which SE in the plurality of SEs of the terminal carries the NFC application accessed by the transaction instruction. In other words, the terminal may determine the target SE based on the first routing table. The first routing table may include a correspondence between related information about all NFC applications installed in the terminal and an SE identifier of an SE that carries each NFC application (but not limited to the SE identifier, for example, a physical channel identifier or a logical channel identifier between the SE that carries each NFC application and the NFCC). In the following embodiment, an example in which the first routing table includes the correspondence between the related information about all the NFC applications installed in the terminal and the SE identifier of the SE that carries each NFC application is used for description.

The terminal may determine, based on a second routing table maintained by the terminal from at least one NFC application carried in the target SE, the NFC application accessed by the transaction instruction, or in other words, determine the target NFC application. The terminal may maintain a second routing table for each SE in the terminal. The second routing table may include a correspondence between related information about each NFC application carried in the SE and a handle (handle) of the NFC application.

Each of the plurality of SEs of the terminal may carry at least one NFC application. The NFC application may be downloaded by the terminal from the server. When downloading the NFC application, the terminal may separately configure routing information corresponding to the NFC application in the first routing table and the second routing table. Then, the terminal may determine the target NFC application based on the routing information and automatically activate the target NFC application, to complete a transaction.

For example, the first routing table is shown in Table 2. It may be learned from Table 2 that the first routing table includes a correspondence between related information about an NFC application and an SE identifier of an SE that carries the NFC application. In the related information about the NFC application, an AID is an identifier of the NFC application, and there is a unique AID in a same SE. For example, in a same SE, one AID may be used to uniquely identify a bus card application, a bank card application, an ID card application, or a social security health card application. In addition, AIDs of NFC applications carried in different SEs may be the same or may be different. In this embodiment, an NFC application may be identified in another manner. For different NFC applications, protocol and rules that transaction instructions accessing the NFC applications comply with may be the same or may be different. A protocol and rule that a transaction instruction accessing an NFC application complies with may be determined during installation, or may be dynamically changed during use. For example, transaction instructions accessing a bus card application, a door access card application, and a bank card application have respective to-be-followed protocol and rules. The protocol and rule that the transaction instruction accessing the NFC application complies with may include a user-defined protocol and rule. An NFC physical technology used by the transaction instruction accessing the NFC application includes a TYPEA technology, a TYPEB technology, a TYPEF technology, or the like. For different NFC applications, NFC physical technologies used by transaction instructions accessing the NFC applications may be the same or may be different. The NFC physical technology used by the transaction instruction accessing the NFC application may be determined during installation. For example, a transaction instruction accessing the ID card application uses the TYPEB technology. A transaction instruction accessing the bus card application uses the TYPEA technology. The transaction instruction accessing the NFC application may be a character string. The character string may be fixed or may be dynamically changed. The character string may be one byte or several bits. Character strings accessing different NFC applications may be the same or may be different. The character string accessing the NFC application may be determined during installation, or may be dynamically changed during use. When an NFC application is running, a requirement on a power consumption status of the terminal may include: inductive charging, power-unexhausted, power-exhausted, screen-on, screen-off, and the like. When different NFC applications are running, requirements on power consumption statuses of the terminal may be the same or may be different. For example, when the bank card application is running, a power consumption status of the terminal is screen-on. When the door access card application is running, a power consumption status of the terminal is screen-off. When an NFC application is running, a power consumption status of the terminal may include a predefined power consumption status such as power-unexhausted or power-exhausted, and may further include some user-defined statuses such as a battery level of the terminal. For example, when a specified NFC application is running, the battery level of the terminal is greater than 50%.

TABLE 2

| AID of the NFC application | Related information about an NFC application | | | | Identifier of an SE that carries the NFC application |
|---|---|---|---|---|---|
| | Protocol and rule that a transaction instruction accessing the NFC application complies with | NFC physical technology used by the transaction instruction accessing the NFC application | Transaction instruction accessing the NFC application | Requirement on a power consumption status of the terminal during running of the NFC application | |

When an NFC application is being downloaded, routing information corresponding to the NFC application in the first routing table shown in Table 2 may be configured according to a route configuration command delivered by the DH of the terminal. In the first routing table, actually configured routing information corresponding to the NFC application may include at least one piece of the related information about the NFC application. In other words, the actually configured routing information corresponding to the NFC application may include at least one piece of the following information: the AID of the NFC application, the protocol and rule that the transaction instruction accessing the NFC application complies with, the NFC physical technology used by the transaction instruction accessing the NFC application, the transaction instruction accessing the NFC application, and the requirement on the power consumption status of the terminal during running of the NFC application.

For example, when a specified NFC application is being downloaded, the NFC application is downloaded to a specified SE of the terminal. After determining that the NFC application is successfully downloaded to the SE, the SE of the terminal may send, to the DH of the terminal, a message used to indicate that the NFC application has been successfully downloaded. After receiving the message, the DH of the terminal may send a route configuration command to the NFCC of the terminal. The route configuration command may be locally predefined in the terminal, or may be delivered, to the DH of the terminal, by the server that provides a download resource for the NFC application. The route configuration command is used to indicate the NFCC to configure, in the first routing table, routing information corresponding to the NFC application. The route configuration command may include information to be configured when routing information is being configured in the first routing table, and a specific value of the information to be configured. The route configuration command further includes an SE identifier of the SE that carries the NFC application. The NFCC of the terminal may configure, according to the route configuration command, the routing information corresponding to the NFC application in the first routing table. The routing information may include a correspondence between related information about the NFC application and an SE identifier.

AIDs of NFC applications carried in different SEs may be different, transaction instructions accessing different NFC applications may follow different protocol and rules and use different NFC physical technologies, transaction instructions may be different, and power consumption statuses of the terminal may be different when the NFC applications are running Therefore, after receiving a transaction instruction, the NFCC of the terminal may determine, based on the first routing table shown in Table 2, which SE of the terminal carries an NFC application accessed by the transaction instruction, or in other words, determine the target SE. For example, the NFCC of the terminal may determine routing information (for example, the routing information may be first routing information in this application) from the first routing table based on the first routing table and the transaction instruction. The routing information may be routing information that meets a matching condition (the matching condition may be a first matching condition in this application) in the first routing table. The matching condition may include at least one of the following: a condition a: an AID in routing information is the same as an application identifier AID carried in the transaction instruction; a condition b: a protocol and rule in routing information is the same as a protocol and rule that the transaction instruction complies with; a condition c: an NFC physical technology in routing information is the same as an NFC physical technology used by the transaction instruction; and a condition d: a transaction instruction in routing information is the same as the received transaction instruction. In some embodiments, the NFCC of the terminal may use, as the determined routing information in a preset order (the preset order may be a first preset order in this application) of the foregoing four conditions, routing information that is in the first routing table and that meets the first condition in the preset order.

In addition, when the target SE is being determined, information such as a requirement on a power consumption status of the terminal during running of an NFC application may be used as an auxiliary condition, so that security of automatically activating an NFC application can be improved.

Figure 5A:
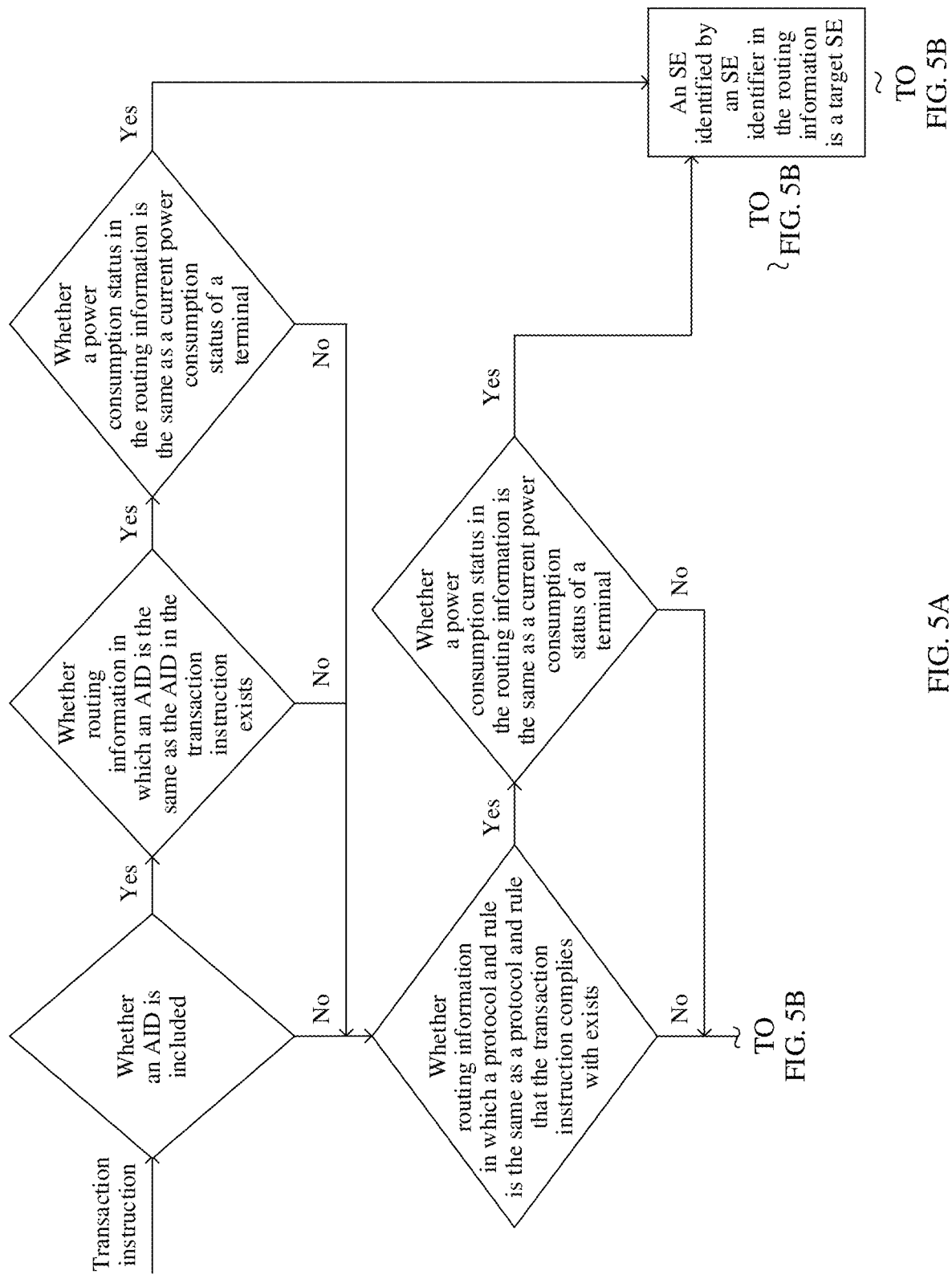
FIG. 5A and FIG. 5B are a schematic scenario diagram of a method for automatically activating an NFC application according to an embodiment of this application.
Figure 5B:
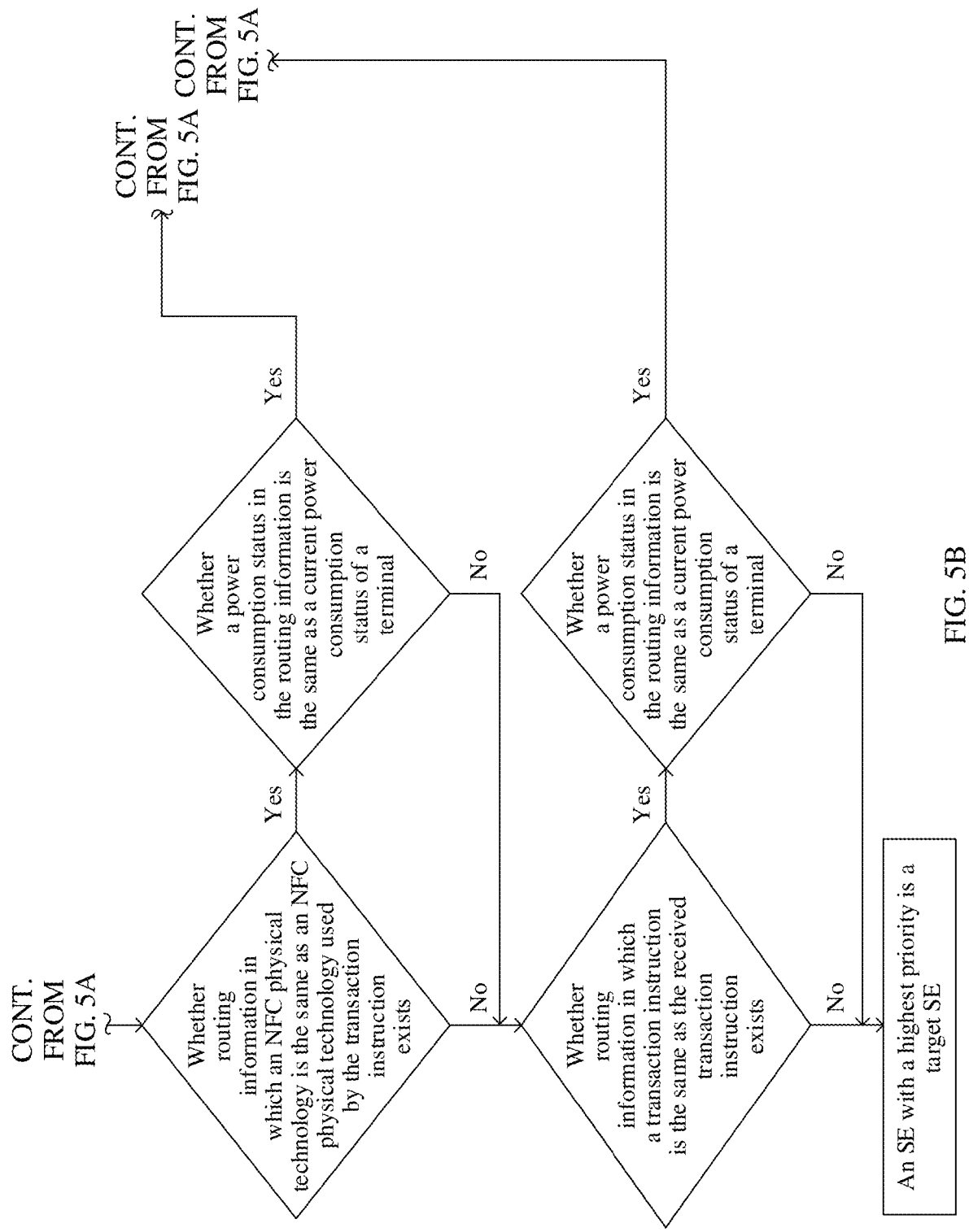

For example, as shown in FIG. 5A and FIG. 5B, the preset order is: the condition a→the condition b→the condition c→the condition d. A specific implementation in which the NFCC of the terminal determines, based on the first routing table, which SE of the terminal carries the NFC application accessed by the transaction instruction may include:

After receiving the transaction instruction, the NFCC of the terminal may determine whether the transaction instruction includes an AID. If it is determined that the transaction instruction includes the AID, routing information in the first routing table may be searched through traversal in a configuration order of each piece of routing information in the first routing table or in a priority order of an SE included in the terminal (a priority of the SE may be predefined or may be set by the user), to determine whether routing information in which an AID is the same as the AID in the received transaction instruction exists in the first routing table. If the routing information in which the AID is the same as the AID in the transaction instruction exists, and a value of information such as the requirement on the power consumption status of the terminal during running of the NFC application included in the piece of routing information is the same as a current power consumption status of the terminal, an SE identified by an SE identifier included in the piece of routing information is the target SE.

If the received transaction instruction does not include the AID, or the routing information in which the AID is the same as the AID in the received transaction instruction does not exist in the first routing table, or the routing information in which the AID is the same as the AID in the received transaction instruction exists in the first routing table, but a value of information such as the requirement on the power consumption status of the terminal during running of the NFC application included in the piece of routing information is different from a current power consumption status of the terminal, the NFCC of the terminal may search routing information in the first routing table through traversal in a configuration order of each piece of routing information in the first routing table or a priority order of an SE included in the terminal, to determine whether routing information in which a protocol and rule is the same as the protocol and rule that the received transaction instruction complies with exists in the first routing table. If the routing information in which the protocol and rule is the same as the protocol and rule that the received transaction instruction complies with exists, and a value of information such as the requirement on the power consumption status of the terminal during running of the NFC application included in the piece of routing information is the same as the current power consumption status of the terminal, an SE identified by an SE identifier included in the piece of routing information is the target SE.

If the routing information in which the protocol and rule is the same as the protocol and rule that the received transaction instruction complies with does not exist in the first routing table, or the routing information in which the protocol and rule is the same as the protocol and rule that the received transaction instruction complies with exists in the first routing table, but a value of information such as the requirement on the power consumption status of the terminal during running of the NFC application included in the piece of routing information is different from the current power consumption status of the terminal, the NFCC of the terminal may search routing information in the first routing table through traversal in a configuration order of each piece of routing information in the first routing table or a priority order of an SE included in the terminal, to determine whether routing information in which an NFC physical technology is the same as the NFC physical technology used by the received transaction instruction exists in the first routing table. If the routing information in which the NFC physical technology is the same as the NFC physical technology used by the received transaction instruction exists, and a value of information such as the requirement on the power consumption status of the terminal during running of the NFC application included in the piece of routing information is the same as the current power consumption status of the terminal, an SE identified by an SE identifier included in the piece of routing information is the target SE.

If the routing information in which the NFC physical technology is the same as the NFC physical technology used by the received transaction instruction does not exist in the first routing table, or the routing information in which the NFC physical technology is the same as the NFC physical technology used by the received transaction instruction exists in the first routing table, but a value of information such as the requirement on the power consumption status of the terminal during running of the NFC application included in the piece of routing information is different from the current power consumption status of the terminal, the NFCC of the terminal may search routing information in the first routing table through traversal in a configuration order of each piece of routing information in the first routing table or a priority order of an SE included in the terminal, to determine whether routing information in which a transaction instruction is the same as the received transaction instruction exists in the first routing table. If the routing information in which the transaction instruction is the same as the received transaction instruction exists, and a value of information such as the requirement on the power consumption status of the terminal during running of the NFC application included in the piece of routing information is the same as the current power consumption status of the terminal, an SE identified by an SE identifier included in the piece of routing information is the target SE.

If the routing information in which the transaction instruction is the same as the received transaction instruction does not exist in the first routing table, or the routing information in which the transaction instruction is the same as the received transaction instruction exists in the first routing table, but a value of information such as the requirement on the power consumption status of the terminal during running of the NFC application included in the piece of routing information is different from the current power consumption status of the terminal, the NFCC of the terminal may use an SE with a highest priority as the target SE.

In some embodiments, the information "the transaction instruction accessing the NFC application" in the related information about the NFC application in Table 2 may be replaced with "mask corresponding to the transaction instruction accessing the NFC application". The mask corresponding to the transaction instruction accessing the NFC application may be some character bits included in a fixed character string corresponding to the transaction instruction. Masks corresponding to character strings accessing different NFC applications may be the same or may be different. Therefore, it may be determined, by using the mask corresponding to the received transaction instruction, which SE of the terminal carries the NFC application accessed by the transaction instruction.

After the terminal determines which SE of the terminal carries the NFC application accessed by the received transaction instruction, or in other words, determines the target SE, the terminal may determine, based on a second routing table of the target SE from at least one NFC application carried in the target SE, the NFC application accessed by the transaction instruction, or in other words, determine the target NFC application.

For example, the second routing table is Table 3. It may be learned from Table 3 that the second routing table includes a correspondence between related information about an NFC application and a handle (handle) of the NFC application. For related descriptions of an AID of the NFC application, a transaction instruction accessing the NFC application, a mask corresponding to the transaction instruction accessing the NFC application, a protocol and rule that the transaction instruction accessing the NFC application complies with, and an NFC physical technology used by the transaction instruction accessing the NFC application in the related information about the NFC application, refer to specific descriptions of corresponding information in the first routing table shown in Table 2. Details are not described herein again. In addition, a fixed priority may be automatically set by the terminal based on a download order of the NFC application, or may be manually set by the user when the NFC application is downloaded. An initial setting of a variable priority may be null (null). Then, the terminal may perform dynamic adjustment based on a habit of using the NFC application by the user and current scenario information. For example, when the user frequently uses an NFC application at a specific time in a specific geographical location, the terminal may set a variable priority of the NFC application to the highest when a current time and a current geographical location are the same as the specific time and the specific geographical location. A handle of the NFC application may be used to uniquely determine the NFC application in an SE.

instruction. The routing information may be routing information that meets a matching condition (the matching condition may be a second matching condition in this application) in the second routing table. The matching condition may include at least one of the following: a

TABLE 3

| AID of the NFC application | Transaction instruction accessing the NFC application | Related information about an NFC application | | | | | Handle of the NFC application |
|---|---|---|---|---|---|---|---|
| | | Mask corresponding to the transaction instruction accessing the NFC application | Fixed priority of the NFC application | Variable priority of the NFC application | Protocol and rule that the transaction instruction accessing the NFC application complies with | NFC physical technology used by the transaction instruction accessing the NFC application | |

When an NFC application is being downloaded, routing information corresponding to the NFC application in the second routing table shown in Table 3 may be configured according to an installation command delivered by the DH of the terminal and an actual situation (a fixed priority and a variable priority are configured based on scenario triggering or a user setting). In the second routing table, actually configured routing information corresponding to the NFC application may include at least one piece of the following: the AID of the NFC application, the transaction instruction accessing the NFC application, the mask corresponding to the transaction instruction accessing the NFC application, the fixed priority of the NFC application, the variable priority of the NFC application, the protocol and rule that the transaction instruction accessing the NFC application complies with, and the NFC physical technology used by the transaction instruction accessing the NFC application.

For example, after receiving a message used to indicate that the NFC application has been successfully downloaded, the DH of the terminal may further send the installation command to the SE that carries the NFC application. The installation command may be delivered by a server of the China Merchants Bank to the DH of the terminal. The installation command is used to indicate the SE to configure the routing information corresponding to the NFC application in the second routing table. The installation command may include information to be configured when routing information is being configured in the second routing table, and a specific value of the information to be configured. The installation command further includes the handle of the NFC application. The SE that carries the NFC application may configure, according to the installation command, the routing information corresponding to the NFC application in the second routing table. The routing information may include the correspondence between the related information about the NFC application and the handle of the NFC application.

Because identifiers of NFC applications carried in a same SE are different, transaction instructions accessing different NFC applications may be different, masks corresponding to the transaction instructions may be different, and variable priorities may be different, after receiving a transaction instruction, the SE of the terminal may determine, based on the second routing table, which NFC application in the SE is an NFC application accessed by the transaction instruction. In this way, the corresponding NFC application is automatically activated, and the transaction instruction is executed, to complete a transaction. For example, the SE of the terminal may determine routing information (for example, the routing information may be second routing information in this application) from the second routing table based on the second routing table and the transaction condition e: an AID in routing information is the same as an AID carried in the transaction instruction; a condition f: a transaction instruction in routing information is the same as the received transaction instruction; a condition g: a mask in routing information is the same as a mask corresponding to the received transaction instruction; and a condition h: a variable priority included in routing information is a first priority, and the first priority is a highest variable priority in routing information in the second routing table. In some embodiments, the SE of the terminal may use, as the determined routing information in a preset order (the preset order may be a second preset order in this application) of the foregoing four conditions, routing information that is in the second routing table and that meets the first condition in the preset order.

In addition, when the target NFC application is being determined, one or two pieces of information such as the protocol and rule that the transaction instruction accessing the NFC application complies with and the NFC physical technology used by the transaction instruction accessing the NFC application may be used as an auxiliary condition. In this way, security of automatically activating an NFC application can be improved.

Figure 6A:
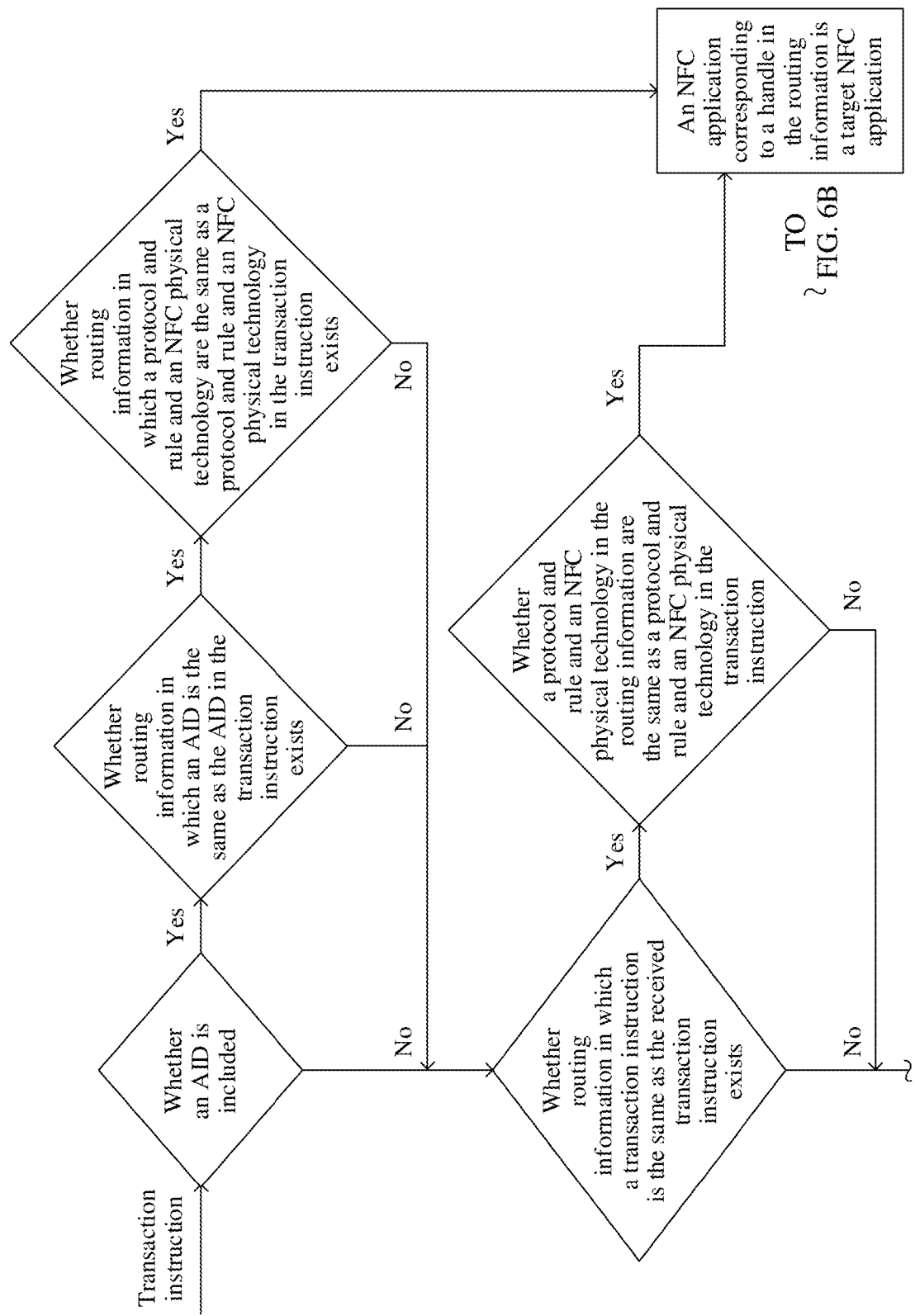

For example, two pieces of information such as the protocol and rule that the transaction instruction accessing the NFC application complies with and the NFC physical technology used by the transaction instruction accessing the NFC application are used as an auxiliary condition to determine the target NFC application, and the preset order is: the condition e→the condition f→the condition g→the condition h. As shown in FIG. 6A and FIG. 6B, a specific implementation in which the SE of the terminal determines, based on the second routing table of the SE from the at least one NFC application carried in the SE, the NFC application accessed by the transaction instruction, or in other words, determiners the target NFC application may include:

After receiving the transaction instruction, the SE of the terminal may determine whether the transaction instruction includes an AID. If the transaction instruction includes the AID, the SE may search routing information in the second routing table through traversal, to determine whether routing information in which an AID is the same as the AID in the transaction instruction exists in the second routing table. If the routing information in which the AID is the same as the AID in the transaction instruction exists in the second routing table, the SE may determine whether values of the two pieces of information such as the protocol and rule that the transaction instruction accessing the NFC application complies with and the NFC physical technology used by the transaction instruction accessing the NFC application included in the piece of routing information are the same as the protocol and rule that the currently received transaction instruction complies with and the NFC physical technology used by the currently received transaction instruction. If the protocol and rule and the used NFC physical technology included in the piece of routing information are the same as the protocol and rule that the currently received transaction instruction complies with and the NFC physical technology used by the currently received transaction instruction, an NFC application corresponding to a handle of the NFC application included in the piece of routing information is the target NFC application.

If the transaction instruction does not include the AID, or the routing information in which the AID is the same as the AID in the received transaction instruction does not exist in the second routing table, or the routing information in which the AID is the same as the AID in the received transaction instruction exists in the second routing table, but the protocol and rule or the used NFC physical technology included in the piece of routing information is different from the protocol and rule that the currently received transaction instruction complies with and the NFC physical technology used by the currently received transaction instruction, the SE of the terminal may search routing information in the second routing table through traversal, to determine whether routing information in which a transaction instruction is the same as the received transaction instruction exists in the second routing table. If the routing information in which the transaction instruction is the same as the received transaction instruction exists in the second routing table, the SE may determine whether values of the two pieces of information such as the protocol and rule that the transaction instruction accessing the NFC application complies with and the NFC physical technology used by the transaction instruction accessing the NFC application included in the piece of routing information are the same as the protocol and rule that the currently received transaction instruction complies with and the NFC physical technology used by the currently received transaction instruction. If the protocol and rule and the used NFC physical technology included in the piece of routing information are the same as the protocol and rule that the currently received transaction instruction complies with and the NFC physical technology used by the currently received transaction instruction, an NFC application corresponding to a handle of the NFC application included in the piece of routing information is the target NFC application.

If the routing information in which the transaction instruction is the same as the received transaction instruction does not exist in the second routing table, or the routing information in which the transaction instruction is the same as the received transaction instruction exists in the second routing table, but the protocol and rule or the used NFC physical technology included in the piece of routing information is different from the protocol and rule that the currently received transaction instruction complies with and the NFC physical technology used by the currently received transaction instruction, the SE of the terminal may search routing information in the second routing table through traversal, to determine whether routing information in which a mask is the same as the mask corresponding to the received transaction instruction exists in the second routing table. If the routing information in which the mask is the same as the mask corresponding to the received transaction instruction exists in the second routing table, the SE may determine whether values of the two pieces of information such as the protocol and rule that the transaction instruction accessing the NFC application complies with and the NFC physical technology used by the transaction instruction accessing the NFC application included in the piece of routing information are the same as the protocol and rule that the currently received transaction instruction complies with and the NFC physical technology used by the currently received transaction instruction. If the protocol and rule and the used NFC physical technology included in the piece of routing information are the same as the protocol and rule that the currently received transaction instruction complies with and the NFC physical technology used by the currently received transaction instruction, an NFC application corresponding to a handle of the NFC application included in the piece of routing information is the target NFC application.

If the routing information in which the mask is the same as the mask corresponding to the received transaction instruction does not exist in the second routing table, or the routing information in which the mask is the same as the mask corresponding to the received transaction instruction exists in the second routing table, but the protocol and rule or the used NFC physical technology included in the piece of routing information is different from the protocol and rule that the currently received transaction instruction complies with and the NFC physical technology used by the currently received transaction instruction, the SE of the terminal may use, as the target NFC application, an NFC application corresponding to a handle of the NFC application included in routing information with a highest variable priority in the second routing table.

If the second routing table does not include information such as the variable priority, or in other words, the target NFC application cannot be determined after the foregoing matching, the SE of the terminal may use a default NFC application as the target NFC application. The default NFC application may be set by the user, or may be predefined.

In some embodiments, the SE of the terminal may search the second routing table through traversal in descending order of priorities with reference to information such as the fixed priority in the second routing table. In some other embodiments, the SE of the terminal may also search the second routing table through traversal in descending order of priorities with reference to information such as the variable priority in the second routing table. In some other embodiments, the SE of the terminal may also search the second routing table through traversal with reference to both the fixed priority and the variable priority in the second routing table. In this way, matching efficiency can be improved, and the NFC application accessed by the received transaction instruction can be quickly determined.

In this way, after determining the target NFC application, the terminal may run the target NFC application in the target SE, and execute the received transaction instruction, to complete a transaction.

For ease of understanding, the following describes an example process of determining the target SE and the target NFC application with reference to a specific example. For example, with reference to FIG. 1, the terminal has three SEs: an SE 1 that exists in a form of a SIM card, an SE 2 that is encapsulated with an NFC chip, and an inSE that exists in a form of an AP of the terminal, for example, referred to as an SE 3.

Figure 7:
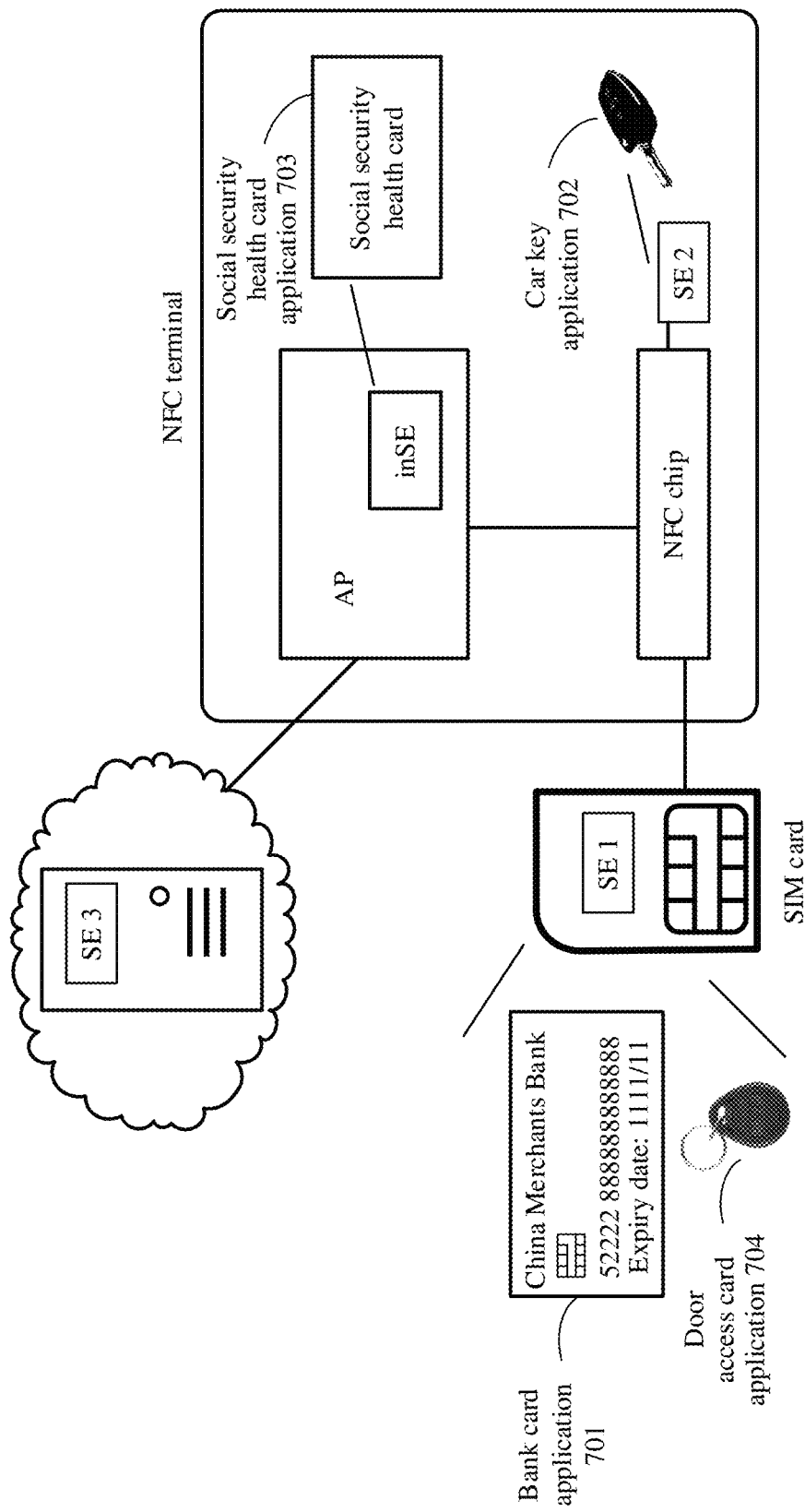
FIG. 7 is another schematic diagram of distribution of an NFC application in an SE of a terminal according to an embodiment of this application.

A plurality of NFC applications are downloaded in the terminal, and these NFC applications may be carried in the three SEs of the terminal. For example, a bank card application 701 of the China Merchants Bank, a car key application 702, a social security health card application 703, and a door access card application 704 are downloaded in the terminal. As shown in FIG. 7, the bank card application 701 of the China Merchants Bank and the door access card application 704 are carried in the SE 1. The car key application 702 is carried in the SE 2. The social security health card application 703 is carried in the SE 3. When the bank card application 701 of the China Merchants Bank, the car key application 702, the social security health card application 703, and the door access card application 704 are being downloaded, the terminal separately configures routing information of each NFC application in the first routing table and the second routing table. For the first routing table after the corresponding routing information is configured, refer to Table 4. The second routing table in the SE 1 after the corresponding routing information is configured is shown in Table 5. The second routing table in the SE 2 after the corresponding routing information is configured is shown in Table 6. The second routing table in the SE 3 after the corresponding routing information is configured is shown in Table 7.

TABLE 4

| | | | First routing table | | | |
|---|---|---|---|---|---|---|
| AID of the NFC application | Protocol and rule that a transaction instruction accessing the NFC application complies with | NFC physical technology used by the transaction instruction accessing the NFC application | Transaction instruction accessing the NFC application | Power consumption status of the terminal during running of the NFC application | SE identifier of an SE that carries the NFC application |
| AID 1 | Protocol and rule 1 | null | null | Screen-On | SE 1 |
| null | Protocol and rule 2 | NFC physical technology 2 | null | Power-Unexhausted | SE 2 |
| AID 3 | null | NFC physical technology 3 | null | Screen-On | SE 3 |
| null | null | null | Transaction instruction 4 | Screen-Off | SE 1 |

In the first routing table shown in Table 4, the first piece of routing information is routing information corresponding to the bank card application 701 of the China Merchants Bank. The second piece of routing information is routing information corresponding to the car key application 702. The third piece of routing information is routing information corresponding to the social security health card application 703. The fourth piece of routing information is routing information corresponding to the door access card application 704.

TABLE 5

| | | | | | Second routing table in the SE 1 | | |
|---|---|---|---|---|---|---|---|
| AID of the NFC application | Transaction instruction accessing the NFC application | Mask corresponding to the transaction instruction accessing the NFC application | Fixed priority of the NFC application | Variable priority of the NFC application | Protocol and rule that the transaction instruction accessing the NFC application complies with | NFC physical technology used by the transaction instruction accessing the NFC application | Handle of the NFC application |
| AID 1 | null | null | 1 | null | Protocol and rule 1 | NFC physical technology 1 | Handle 1 |
| null | Transaction instruction 4 | null | 2 | null | Protocol and rule 4 | NFC physical technology 4 | Handle 4 |

In the second routing table in the SE 1 shown in Table 5, the first piece of routing information is routing information corresponding to the bank card application 701 of the China Merchants Bank. The second piece of routing information is routing information corresponding to the door access card application 704.

TABLE 6

| | | | | | Second routine table in the SE 2 | | |
|---|---|---|---|---|---|---|---|
| AID of the NFC application | Transaction instruction accessing the NFC application | Mask corresponding to the transaction instruction accessing the NFC application | Fixed priority of the NFC application | Variable priority of the NFC application | Protocol and rule that the transaction instruction accessing the NFC application complies with | NFC physical technology used by the transaction instruction accessing the NFC application | Handle of the NFC application |
| null | null | Mask 2 | 1 | null | Protocol and rule 2 | NFC physical technology 2 | Handle 2 |

In the second routing table in the SE 2 shown in Table 6, the first piece of routing information is routing information corresponding to the car key application 702.

a server of the China Merchants Bank to the DH of the terminal. For example, the installation command includes information to be configured when routing information is

TABLE 7

Second routing table in the SE 3

| AID of the NFC application | Transaction instruction accessing the NFC application | Mask corresponding to the transaction instruction accessing the NFC application | Fixed priority of the NFC application | Variable priority of the NFC application | Protocol and rule that the transaction instruction accessing the NFC application complies with | NFC physical technology used by the transaction instruction accessing the NFC application | Handle of the NFC application |
|---|---|---|---|---|---|---|---|
| AID 3 | null | null | 1 | null | Protocol and rule 3 | NFC physical technology 3 | Handle 3 |

In the second routing table in the SE 3 shown in Table 7, the first piece of routing information is routing information corresponding to the social security health card application 703.

An example in which the routing information of the bank card application 701 of the China Merchants Bank is configured is used to describe a process of route configuration in the first routing table and the second routing table. Specific descriptions of processes of configuring the routing information corresponding to the door access card application 704, the car key application 702, and the social security health card application 703 are similar to specific descriptions of a process of configuring the routing information corresponding to the bank card application 701 of the China Merchants Bank.

For example, the user expects that the terminal can model the bank card application 701 of the China Merchants Bank. The terminal may download the bank card application 701 of the China Merchants Bank to an SE of the terminal based on an operation of the user. For example, the bank card application 701 is downloaded to the SE 1. After the bank card application 701 is successfully downloaded to the SE 1, the SE 1 may send a success indication message to the DH of the terminal. In response to the message, the DH of the terminal may send a route configuration command to the NFCC of the terminal. For example, the route configuration command includes information to be configured when routing information is being configured in the first routing table: an AID of the bank card application 701 of the China Merchants Bank, a protocol and rule that a transaction instruction accessing the bank card application 701 complies with, and a requirement on a power consumption status of the terminal during running of the NFC application. Specific values of the three pieces of information to be configured are the AID 1, the protocol and rule 1, and screen-on. The route configuration command further includes an SE identifier of an SE that carries the bank card application 701 of the China Merchants Bank, for example, the SE 1.

The NFCC of the terminal may perform route configuration according to the route configuration command delivered by the DH, that is, configure the routing information corresponding to the bank card application 701 of the China Merchants Bank in the first routing table. For example, the configured routing information is the first piece of routing information in the first routing table shown in Table 4. The NFCC of the terminal may set other information that is not configured as null (null).

The DH of the terminal may further send an installation command to the SE 1 of the terminal in response to the received message. The installation command is delivered by a server of the China Merchants Bank to the DH of the terminal. For example, the installation command includes information to be configured when routing information is being configured in the second routing table: an AID of the bank card application 701 of the China Merchants Bank, a protocol and rule that a transaction instruction accessing the bank card application 701 complies with, and an NFC physical technology used by the transaction instruction accessing the bank card application 701. Specific values of the three pieces of information to be configured are the AID 1, the protocol and rule 1, and the NFC physical technology 1. The installation command further includes a handle of the bank card application 701, for example, the handle 1.

The SE 1 of the terminal may perform route configuration according to the installation command delivered by the DH, that is, configure the routing information corresponding to the bank card application 701 of the China Merchants Bank in the second routing table in the SE 1. The configured routing information is the first piece of routing information shown in Table 5. A fixed priority of the bank card application 701 is set based on a download order, for example, set to 1 (a larger value indicates a lower fixed priority). A variable priority is null (null), and other information that is not configured is also set as null.

In this way, configuration of the routing information corresponding to the bank card application 701 of the China Merchants Bank is completed, and the routing information may be subsequently used to determine whether the transaction instruction is to access the NFC application.

For example, when the user pays after shopping in a supermarket, the user may approach a POS machine at a cashier with the terminal. The NFCC of the terminal may receive a transaction instruction sent by the POS machine, where the transaction instruction carries the AID 1. The NFCC of the terminal may determine whether the received transaction instruction includes an AID. When determining that the transaction instruction includes the AID, the NFCC of the terminal may search, through traversal in a priority order of an SE, routing information in the first routing table shown in Table 4, to determine whether routing information in which an AID is the same as the AID 1 exists in the first routing table shown in Table 4. It may be learned from Table 4 that an AID in the first piece of routing information in the first routing table shown in Table 4 is the same as the AID 1. The NFCC of the terminal may obtain a current power consumption status of the terminal. For example, the obtained current power consumption status is screen-on, and is the same as a value "screen-on" of information such as a requirement on a power consumption status of the terminal during running of the NFC application included in the piece of routing information. In this case, the NFCC of the terminal may determine, based on the first piece of routing information, that the SE 1 is the target SE. After determining that the SE 1 is the target SE, the NFCC of the terminal may send the transaction instruction to the SE 1.

After receiving the transaction instruction, the SE 1 may determine, according to the transaction instruction, which NFC application in the SE 1 is the NFC application accessed by the transaction instruction. For example, after receiving the transaction instruction, the SE 1 may determine whether the transaction instruction includes an AID. When determining that the transaction instruction includes the AID, the SE 1 may search, through traversal in an order of a fixed priority, routing information in the second routing table shown in Table 5, to determine whether routing information in which an AID is the same as the AID 1 exists in the second routing table. It may be learned from Table 5 that an AID in the first piece of routing information in the first routing table shown in Table 5 is the same as the AID 1. The SE 1 may determine whether a protocol and rule that the received transaction instruction complies with and an NFC physical technology used by the received transaction instruction are the protocol and rule 1 and the NFC physical technology 1. If yes, the SE 1 may determine that an NFC application corresponding to the handle 1 in the piece of routing information is the target NFC application, that is, the bank card application 701 of the China Merchants Bank carried in the SE 1 is the NFC application accessed by the transaction instruction. The SE 1 may run the bank card application 701, and execute the transaction instruction, to complete deduction.

For another example, if the user wants to drive home, the user may approach a car door of a vehicle with the terminal. The NFCC of the terminal may receive a transaction instruction sent by a card reader on the car door, where the transaction instruction does not carry an AID. The NFCC of the terminal may determine whether the received transaction instruction includes an AID. When determining that the transaction instruction does not include an AID, the NFCC of the terminal may search, through traversal in a priority order of an SE, routing information in the first routing table shown in Table 4, to determine whether routing information in which a protocol and rule is the same as the protocol and rule that the received transaction instruction complies with exists in the first routing table shown in Table 4. For example, the protocol and rule that the received transaction instruction complies with is the protocol and rule 2. It may be learned from Table 4 that, in a priority order of an SE, the NFCC of the terminal searches the first piece of routing information to determine that a value of information such as a protocol and rule included in the first piece of routing information is different from the protocol and rule 2; searches the fourth piece of routing information to determine that a value of information such as a protocol and rule included in the fourth piece of routing information is also different from the protocol and rule 2; and then searches the second piece of routing information to determine that a value of information such as a protocol and rule included in the second piece of routing information is the same as the protocol and rule 2. The NFCC of the terminal may obtain a current power consumption status of the terminal. For example, the obtained current power consumption status is power-unexhausted, and is the same as a value "power-unexhausted" of information such as a requirement on a power consumption status of the terminal during running of the NFC application included in the piece of routing information. In this case, the NFCC of the terminal may determine, based on the second piece of routing information, that the SE 2 is the target SE. After determining that the SE 2 is the target SE, the NFCC of the terminal may send the transaction instruction to the SE 2.

After receiving the transaction instruction, the SE 2 may determine, according to the transaction instruction, which NFC application in the SE 2 is the NFC application accessed by the transaction instruction. For example, after receiving the transaction instruction, the SE 2 may determine whether the transaction instruction includes an AID. When determining that the transaction instruction does not include the AID, the SE 2 may search, through traversal, routing information in the second routing table shown in Table 6, to determine whether routing information in which a transaction instruction is the same as the received transaction instruction exists in the second routing table. If the routing information in which the transaction instruction is the same as the received transaction instruction is not found, routing information in which a mask is the same as the mask corresponding to the received transaction instruction is searched based on Table 6. For example, the mask corresponding to the received transaction instruction is the mask 2. In this case, the SE 2 may determine whether a protocol and rule that the received transaction instruction complies with and an NFC physical technology used by the received transaction instruction are the protocol and rule 2 and the NFC physical technology 2. If yes, the SE 2 may determine that an NFC application corresponding to the handle 2 in the piece of routing information is the target NFC application, that is, the car key application 702 carried in the SE 2 is the NFC application accessed by the transaction instruction. The SE 2 may run the car key application 702, and execute the transaction instruction, to open the car door.

For another example, when the user drives home and wants to open a room door, the user may approach a door lock of the room door with the terminal. The NFCC of the terminal may receive a transaction instruction sent by the door lock, where the transaction instruction does not carry an AID. The NFCC of the terminal may determine whether the received transaction instruction includes an AID. When determining that the transaction instruction does not include an AID, the NFCC of the terminal may search, through traversal in a priority order of an SE, routing information in the first routing table shown in Table 4, to determine whether routing information in which a protocol and rule is the same as the protocol and rule that the received transaction instruction complies with exists in the first routing table shown in Table 4. For example, the protocol and rule that the received transaction instruction complies with is the protocol and rule 4. It may be learned from Table 4 that routing information in which a protocol and rule is the same as the protocol and rule 4 that the received transaction instruction complies with does not exist in the first routing table. The NFCC of the terminal may search, through traversal in a priority order of an SE, routing information in the first routing table shown in Table 4, to determine whether routing information in which an NFC physical technology is the same as the NFC physical technology used by the received transaction instruction exists in the first routing table shown in Table 4. For example, the NFC physical technology used by the received transaction instruction is the NFC physical technology 4. It may be learned from Table 4 that routing information in which an NFC physical technology is the same as the NFC physical technology 4 used by the received transaction instruction does not exist in the first routing table. The NFCC of the terminal may search, through traversal in a priority order of an SE, routing information in the first routing table shown in Table 4, to determine whether routing information in which a transaction instruction is the same as the received transaction instruction exists in the first routing table shown in Table 4. For example, the received transaction instruction is the transaction instruction 4. It may be learned from Table 4 that a transaction instruction in the fourth piece of routing information in the first routing table shown in Table 4 is the same as the transaction instruction 4. The NFCC of the terminal may obtain a current power consumption status of the terminal. For example, the obtained current power consumption status is screen-off, and is the same as a value "screen-off" of information such as a requirement on a power consumption status of the terminal during running of the NFC application included in the piece of routing information. In this case, the NFCC of the terminal may determine, based on the fourth piece of routing information, that the SE 1 is the target SE. After determining that the SE 1 is the target SE, the NFCC of the terminal may send the transaction instruction to the SE 1.

After receiving the transaction instruction, the SE 1 may determine, according to the transaction instruction, which NFC application in the SE 1 is the NFC application accessed by the transaction instruction. For example, after receiving the transaction instruction, the SE 1 may determine whether the transaction instruction includes an AID. When determining that the transaction instruction does not include the AID, the SE 1 may search, through traversal in an order of a fixed priority, routing information in the second routing table shown in Table 5, to determine whether routing information in which a transaction instruction is the same as the transaction instruction 4 exists in the second routing table. It may be learned from Table 5 that a transaction instruction in the second piece of routing information in the first routing table shown in Table 5 is the same as the transaction instruction 4. The SE 1 may determine whether a protocol and rule that the received transaction instruction complies with and an NFC physical technology used by the received transaction instruction are the protocol and rule 4 and the NFC physical technology 4. If yes, the SE 1 may determine that an NFC application corresponding to the handle 4 in the piece of routing information is the target NFC application, that is, the door access card application 704 carried in the SE 1 is the NFC application accessed by the transaction instruction. The SE 1 may run the door access card application 704, and execute the transaction instruction, to open the room door.

It may be learned from the above that, the user approaches the corresponding card reader or POS machine with the terminal for payment, or to open the car door, or to open the room door, so that the terminal can identify the corresponding NFC application and automatically activate NFC application, to complete a transaction. The user does not perform manual switching, thereby improving efficiency of interaction between the terminal and the user, and improving intelligence of the terminal. In this way, use experience of the user is greatly improved.

Figure 8:
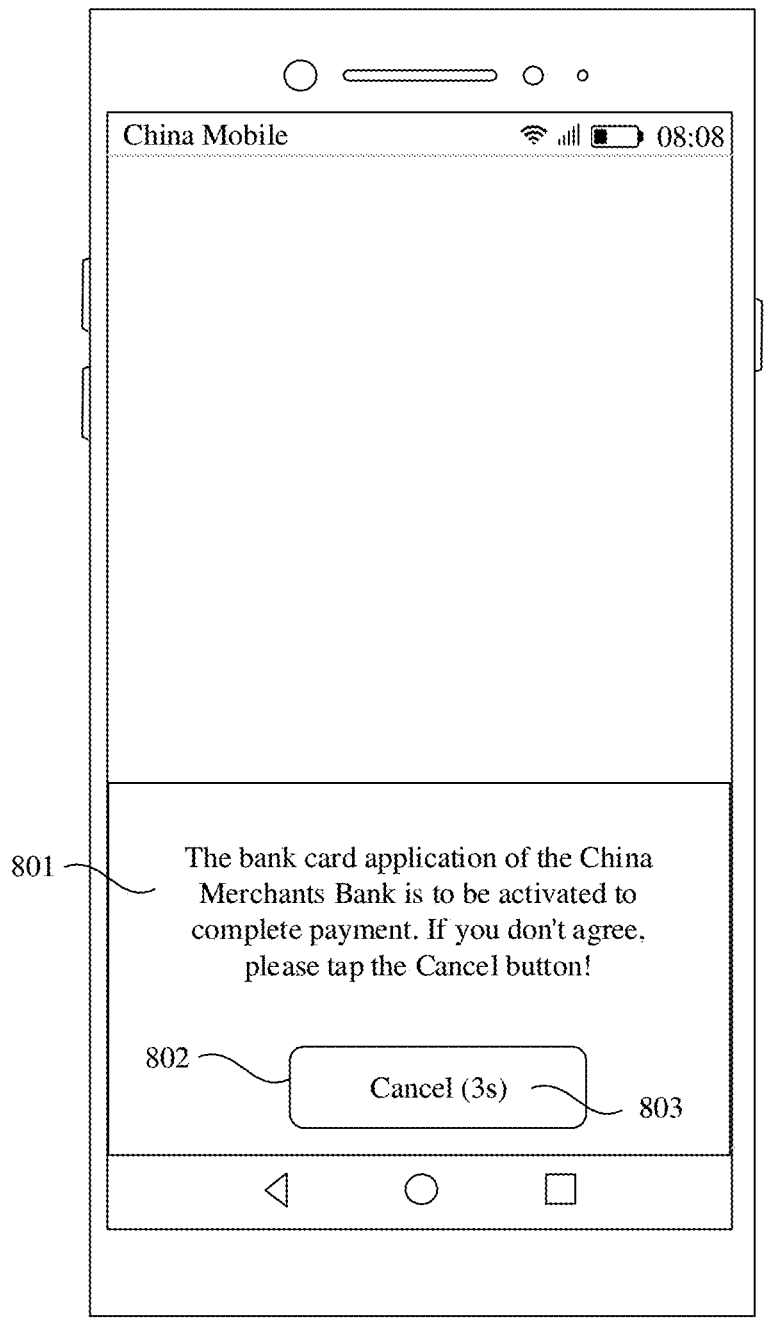
FIG. 8 is another schematic diagram of a display interface of a terminal according to an embodiment of this application.

In some embodiments, to access the NFC application that is automatically activated by the terminal and that is not intended by the user, after determining the target NFC application, the terminal may display prompt information on a display screen of the terminal, to indicate the user that the target NFC application is to be activated, to complete a transaction. For example, as shown in FIG. 8, the terminal determines that the target NFC application is the bank card application 701 of the China Merchants Bank when the user pays after shopping in the supermarket. After determining that the target NFC application is the bank card application 701 of the China Merchants Bank, the terminal may display a prompt window. The prompt window includes prompt information 801, and the prompt information 801 may indicate the user that the bank card application 701 of the China Merchants Bank is to be activated, to complete payment. The terminal may further display a cancel button 802 in the prompt window. When the user does not want to use the bank card application 701 of the China Merchants Bank for payment, the user may perform a tap operation on the cancel button 802. In response to the tap operation, the terminal may not perform an operation of activating the bank card application 701 of the China Merchants Bank. The terminal may further display a countdown 803 in the prompt window, to indicate the user that the bank card application 701 of the China Merchants Bank is to be activated when the countdown ends (for example, after 3 seconds), and the prompt window is also to be automatically closed.

In some other embodiments of this application, in a scenario in which the terminal has a plurality of SEs (for example, three SEs, and SE identifiers of the three SEs are an SE 1, an SE 2, and an SE 3), the terminal may store a correspondence between an SE and an NFC application carried in the SE. For example, as shown in Table 8, the terminal stores a correspondence between an SE identifier and an NFC application carried in the SE. An SE whose identifier is the SE 1 carries an NFC application 1, an NFC application 3, and an NFC application 6. An SE whose identifier is the SE 2 carries an NFC application 4 and an NFC application 5. An SE whose identifier is the SE 3 carries an NFC application 2 and an NFC application 7.

TABLE 8

| SE identifier | NFC application |
| --- | --- |
| SE 1 | NFC application 1 |
|  | NFC application 3 |
|  | NFC application 6 |
| SE 2 | NFC application 4 |
|  | NFC application 5 |
| SE 3 | NFC application 2 |
|  | NFC application 7 |

When the user approaches the POS machine or the card reader with the terminal, the user may receive a transaction instruction, where the transaction instruction may carry an SE identifier of an SE in which an NFC application to be accessed by the transaction instruction is located. In this way, the terminal may determine, based on the SE identifier carried in the transaction instruction and Table 8, the SE in which the NFC accessed by the transaction instruction is carried, or in other words, determine the target SE. If the target SE is not activated, the terminal may activate the target SE. Then, the NFC application to be accessed by the transaction instruction, namely, the target NFC application, may be determined from the target SE, and is automatically activated. For a specific implementation of determining the target NFC application from the target SE, refer to specific descriptions of corresponding content in other embodiments of this application. Details are not described herein again.

Figure 9:
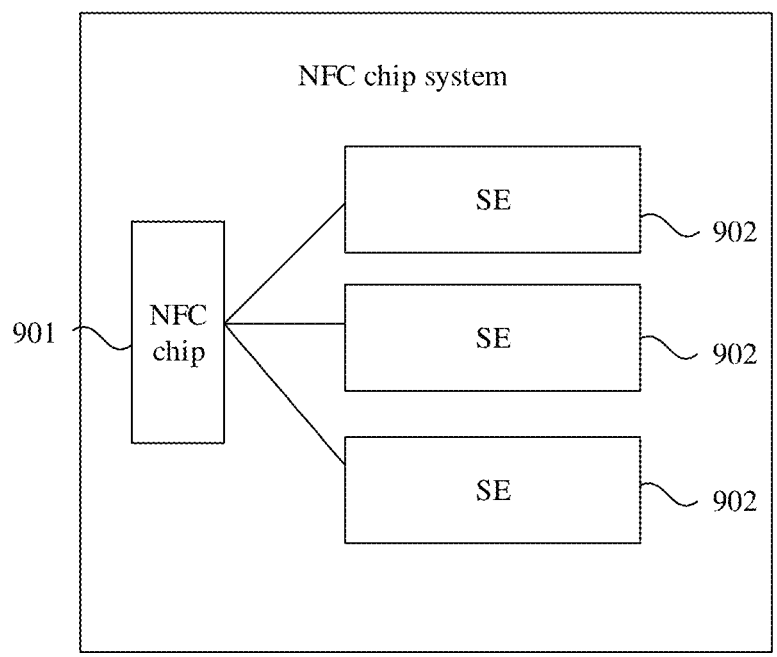
FIG. 9 is a schematic composition diagram of an NFC chip system according to an embodiment of this application.

As shown in FIG. 9, another embodiment of this application provides an NFC chip system. The NFC chip system may include an NFC chip 901 and at least two SEs 902 (an example in which three SEs are included is shown in FIG. 9). The NFC chip 901 and a target SE in the at least two SEs 902 may be configured to perform the method for automatically activating an NFC application provided in any one of the foregoing embodiments. The target SE may be any one of the at least two SEs.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of this application may be essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A terminal, wherein the terminal comprises:
a near field communication (NFC) controller;
at least two secure elements (SEs), and
each of the at least two SEs carries at least one NFC application;
wherein the NFC controller is configured to (1) receive a transaction instruction, (2) determine a target SE from the at least two SEs according to the transaction instruction, and (3) send the transaction instruction to the target SE;
wherein the target SE is configured to (1) receive the transaction instruction, (2) determine, according to the transaction instruction, a target NFC application from an NFC application carried in the target SE; (3) run the target NFC application, and (4) execute the transaction instruction;
wherein the NFC controller is further configured to determine:
(1) first routing information from a first routing table based on the first routing table and the transaction instruction, wherein the first routing information is routing information that meets a first matching condition in the first routing table, and the first routing information comprises an SE identifier; and
(2) an identified SE by the SE identifier in the at least two SEs; wherein the first matching condition comprises the following: a condition (a): an application identifier (AID) in the routing information is the same as an AID carried in the transaction instruction; a condition (b): a first protocol and rule in the routing information is the same as a second protocol and rule that the transaction instruction complies with; a condition (c): a first NFC physical technology in the routing information is the same as a second NFC physical technology used by the transaction instruction; and a condition (d): a routing information transaction instruction is the same as the received transaction instruction.

2. The terminal according to claim 1, wherein sequentially determine the routing information in the first routing table based on the first routing table and the transaction instruction in a first preset order of the condition (a), the condition (b), the condition (c), and the condition (d), and determine, as the first routing information, the routing information that is in the first routing table and that meets a first condition in the first preset order.

3. The terminal according to claim 2, wherein the first preset order is: the condition (a)→the condition (b)→the condition (c)→the condition (d).

4. The terminal according to claim 1, wherein the target SE is further configured to:
carry at least two NFC applications;
determine second routing information from a second routing table based on the second routing table and the transaction instruction, wherein the second routing information is routing information that meets a second matching condition in the second routing table, and the second routing information comprises a handle; and
determine, as the target NFC application, an NFC application corresponding to handle the at least two NFC applications; wherein
the second matching condition comprises at least one of the following: a condition (e): an AID in the routing information is the same as an AID carried in the transaction instruction; a condition (f): a routing information transaction instruction is the same as the received transaction instruction; a condition (g): a mask in the routing information is the same as a mask corresponding to the received transaction instruction; and a condition (h): a variable priority comprised in the routing information is a first priority, and the first priority is a highest variable priority in the routing information in the second routing table.

5. The terminal according to claim 4, wherein the target SE is further configured to route information in the second routing table based on the second routing table and the transaction instruction in a second preset order of the condition (e), the condition (f), the condition (g), and the condition (h), and determine, as the second routing information, the routing information that is in the second routing table and that meets a first condition in the second preset order.

6. The terminal according to claim 5, wherein the second preset order is: the condition (e)→the condition (f)→the condition (g)→the condition (h).

7. The terminal according to claim 4, wherein the NFC controller is further configured to, when the target NFC application is being downloaded, configure the first routing information in the first routing table, wherein the first routing information further comprises at least one of the following: (1) an AID of the target NFC application, (2) a third protocol and rule that the transaction instruction accessing the target NFC application complies with, a third NFC physical technology used by the transaction instruction accessing the target NFC application, and (3) the transaction instruction accessing the target NFC application.

8. The terminal according to claim 4, wherein the target SE is further configured to, when the target NFC application is being downloaded, configure the second routing information in the second routing table, wherein the second routing information further comprises at least one of the following: (1) an AID of the target NFC application, (2) a second routing information transaction instruction accessing the target NFC application, (3) a mask corresponding to the transaction instruction accessing the target NFC application, and (4) a variable priority of the target NFC application.

9. The terminal according to claim 1, wherein when the first routing information meets the first matching condition, a power consumption status in the first routing information is the same as a current power consumption status of the terminal.

10. The terminal according to claim 4, wherein
when the second routing information meets the second matching condition, a first protocol and rule in the second routing information is the same as a second protocol and rule that the received transaction instruction complies with, and an NFC physical technology in the second routing information is the same as the NFC physical technology used by the received transaction instruction.

11. A method for automatically activating a near field communication (NFC) application, applied to a terminal, wherein the terminal comprises at least two secure elements (SEs), a first SE in the at least two SEs is in an active state by default, the first SE is any one of the at least two SEs, and the first SE carries an NFC application that supports a first application identifier (AID) in the terminal; and the method comprises:
receiving, by the terminal, a first transaction instruction, wherein the first transaction instruction comprises the first AID;
determining, by the terminal, routing information for an identified NFC application from a routing table based on the first transaction instruction, wherein the routing information matches a first matching condition that includes a condition (a): a second application identifier (AID) in the routing information matching the first AID; a condition (b): a first protocol and rule in the routing information is the same as a second protocol and rule that the transaction instruction complies with;
a condition (c): a first NFC physical technology in the routing information is the same as a second NFC physical technology used by the transaction instruction; and a condition (d): a routing information transaction instruction is the same as the first transaction instruction;
running, by the terminal by using the first SE, the identified NFC application identified by the first AID in the first transaction instruction, to execute the first transaction instruction.

12. The method according to claim 11, wherein the identified NFC application that supports the first AID in the terminal comprises a first NFC application, and the method further comprises:
responsive to downloading the first NFC application, determining, by the terminal, that the first NFC application supports the first AID; and
downloading, by the terminal, the first NFC application to the first SE.

13. The method according to claim 12, wherein the determining, by the terminal, that the first NFC application supports the AID comprises:
determining, by the terminal, that a first NFC application AID is comprised in a whitelist, wherein the whitelist comprises one or more NFC application AIDs supporting the AID.

14. The method according to claim 11, wherein the at least two SEs further comprise a second SE, and the NFC application that supports the first AID in the terminal comprises a second NFC application; and the method further comprises:
responsive to the second NFC application being carried in the second SE, determining, by the terminal, that the second NFC application supports the first AID; and
moving, by the terminal, the second NFC application from the second SE to the first SE.

15. The method according to claim 11, wherein the first SE further carries a first NFC application whose use frequency is greater than a threshold; and the method further comprises:
receiving, by the terminal, a second transaction instruction;
obtaining, by the terminal, a time and/or a geographical location at which the second transaction instruction is received;
determining, by the terminal based on the time and/or the geographical location at which the second transaction instruction is received, a second NFC application to be accessed by the second transaction instruction; and
running, by the terminal by using the first SE, the second NFC application to be accessed by the second transaction instruction, and executing the second transaction instruction.

* * * * *